(12) United States Patent
Hirosaki et al.

(10) Patent No.: US 6,579,819 B2
(45) Date of Patent: Jun. 17, 2003

(54) SILICON NITRIDE SINTERED PRODUCTS AND PROCESSES FOR THEIR PRODUCTION

(75) Inventors: Naoto Hirosaki, Ibaraki (JP); Toshiyuki Nishimura, Ibaraki (JP); Yoshinobu Yamamoto, Ibaraki (JP); Mamoru Mitomo, Ibaraki (JP)

(73) Assignee: National Institute for Research in Inorganic Materials, Tsukuba (JP)

( * ) Notice: Subject to any disclaimer, the term of this patent is extended or adjusted under 35 U.S.C. 154(b) by 60 days.

(21) Appl. No.: 09/796,430

(22) Filed: Mar. 2, 2001

(65) Prior Publication Data

US 2002/0045530 A1 Apr. 18, 2002

(30) Foreign Application Priority Data

Aug. 29, 2000 (JP) ........................................ 2000-258568
Oct. 24, 2000 (JP) ........................................ 2000-324327

(51) Int. Cl.$^7$ ............................................ C04B 35/587
(52) U.S. Cl. ...................... 501/97.2; 264/647; 264/665; 264/683
(58) Field of Search .......................... 501/97.2; 264/647, 264/665, 683

(56) References Cited

U.S. PATENT DOCUMENTS 5,804,523 A * 9/1998 Oda et al. ................... 501/97.2
6,187,706 B1 * 2/2001 Okabe et al. ............... 501/97.1
6,297,184 B1 * 10/2001 Fukudome et al. ........ 501/97.2

* cited by examiner

*Primary Examiner*—Karl Group
(74) *Attorney, Agent, or Firm*—Oblon, Spivak, McClelland, Maier & Neustadt, P.C.

(57) ABSTRACT

A silicon nitride sintered product comprising silicon nitride grains and a grain boundary phase, wherein the grain boundary phase consists essentially of a single phase of a $Lu_4Si_2O_7N_2$ crystal phase, and the composition of the silicon nitride sintered product is a composition in or around a triangle ABC having point A: $Si_3N_4$, point B: 28 mol % $SiO_2$-72 mol % $Lu_2O_3$ and point C: 16 mol % $SiO_2$-84 mol % $Lu_2O_3$, as three apexes, in a ternary system phase diagram of a $Si_3N_4$—$SiO_2$—$Lu_2O_3$ system. Also disclosed is a silicon nitride sintered product comprising silicon nitride grains and a grain boundary phase of an oxynitride, wherein the composition of the sintered product is a composition in a triangle having point A: $Si_3N_4$, point B: 40 mol % $SiO_2$-60 mol % $Lu_2O_3$ and point C: 60 mol % $SiO_2$-40 mol % $Lu_2O_3$, as three apexes, in a ternary system phase diagram of a $Si_3N_4$—$SiO_2$—$Lu_2O_3$ system.

11 Claims, 7 Drawing Sheets

D : $RE_2Si_2O_7$

S : $RE_2SiO_5$

N : $RE_{10}SiO_{23}N_4$

K : $RESiO_2N$

J : $RE_4Si_2O_7N_2$

M : $RE_2Si_3O_3N_4$

SILICON NITRIDE SINTERED PRODUCTS AND PROCESSES FOR THEIR PRODUCTION

BACKGROUND OF THE INVENTION

1. Field of the Invention

The present invention relates to silicon nitride sintered products and processes for their production. More particularly, the present invention relates to silicon nitride sintered products which have excellent oxidation resistance and high strength at high temperatures and which are useful as materials for structural parts of various machines, instruments and equipments including automobiles, mechanical apparatus, chemical apparatus and aerospace equipments, and processes for producing such silicon nitride sintered products.

2. Discussion of Background

Sintered products containing silicon nitride as the main component i.e. silicon nitride sintered products are chemically stable at normal or high temperatures and have high mechanical strength, and they are expected to be used for sliding parts such as bearings or engine parts such as turbocharger rotors.

Heretofore, in order to obtain a silicon nitride sintered product having high strength, an oxide was added as a sintering aid to a silicon nitride powder, followed by firing at a temperature of at least 1,600° C. to carry out liquid phase sintering and densification. Magnesium oxide, aluminum oxide and oxides of rare earth elements are known as oxides effective as sintering aids. Among them, magnetism oxide, aluminum oxide and yttrium oxide are commonly used alone or in the form of a mixture during the firing. Such a sintering aid reacts with silicon oxide as an oxide layer on the surface of the material at a high temperature, to form a liquid phase. Sintering proceeds as silicon nitride will diffuse in the liquid phase thus formed. Upon cooling after the sintering, the majority of the liquid phase will remain at the grain boundaries in the form of a glass phase, although a part of the liquid phase will be crystallized as an oxide or an oxynitride. Accordingly, a silicon nitride sintered product is usually composed of silicon nitride grains and a glass phase as the grain boundary phase.

However, when such a sintered product is used in a high temperature environment of at least 1,000° C., there has been a problem that the glass phase at the grain boundaries softens, whereupon the strength rapidly decreases. The degree of the decrease of strength at a high temperature depends very much on the chemical composition of the grain boundary phase, as the softening temperature of glass is proportional to the melting point of the metal-Si—O system in the grain boundary phase. Accordingly, the high temperature strength or creep resistance will be high when a mixture of aluminum oxide and yttrium oxide is incorporated rather than when magnesium oxide is incorporated as a sintering aid.

Recently, a study has been made on a system wherein a mixture of a rare earth oxide and silicon oxide, is used as a sintering aid. For example, J. Am. Ceram. Soc. No. 75, p. 2050 (1992) reported on a silicon nitride sintered product having high melting point $Y_2Si_2O_7$ precipitated at the grain boundaries by adding a sintering aid of a yttrium oxide-silicon oxide type. In this silicon nitride sintered product, a nitrogen-containing apatite (N phase, $Y_{10}Si_7O_{22}N_4$) or K phase ($YSiO_2N$) as shown in the phase diagram in FIG. 4, or a glass phase of a composition close thereto, constitutes a second grain boundary phase following $Y_2Si_2O_7$. The softening temperature of the N phase or the K phase is not higher than 1,500° C., whereby the high temperature strength or the creep resistance of the silicon nitride sintered product having such a phase or a glass phase similar thereto as the grain boundary phase was not fully satisfactory. Further, also in a phase diagram of a $Si_3N_4$—$Y_2Si_2O_2$—$Si_2N_2O$ ternary system, compositions in and around the triangle having the respective components at its apexes were studied, but the high temperature strengths were not adequate.

Further, with respect to a $Si_3N_4$—$SiO_2$-$RE_2O_3$ (RE: rare earth element) ternary system, JP-A-4-15466 discloses that the J phase ($RE_4Si_2O_7N_2$), the N phase and the K phase as shown in the phase diagram in FIG. 4, were precipitated at the grain boundaries; JP-A-4-243972 discloses that the J phase and a rare earth nitride were precipitated at the grain boundaries; and JP-A-4-292465 discloses that the S phase ($RE_2SiO_5$) was precipitated at the grain boundaries. Further, JP-A-8-48565 discloses that the J phase, or two phases i.e. the J phase and the S phase, as shown in the phase diagram in FIG. 5, were precipitated as the grain boundary phase.

However, in each case, it was necessary to add a large amount of a rare earth oxide to control the composition, and the amount of the grain boundary phase increased, whereby there was a new problem that the product was susceptible to oxidation at a high temperature, thus leading to deterioration of the creep resistance and the oxidation resistance. Further, a special heat treatment was required for the crystallization. These publications disclose nothing about the differences in the effect of incorporation among various rare earth elements.

SUMMARY OF THE INVENTION

Under these circumstances, it is an object of the present invention to provide a silicon nitride sintered product having excellent oxidation resistance and high strength at a high temperature, at the same time, and a process for producing it.

Another object of the present invention is to provide a material excellent in creep resistance by efficiently crystallizing a high melting point sintering assistant at the grain boundaries by means of a common sintering method requiring no special heat treatment, by studying a precise composition relating to the type and the amount of the rare earth element, thereby to solve the above-mentioned problems of the prior art.

A sintering aid is required to form a liquid phase at a temperature not higher than the sintering temperature in order to facilitate the liquid phase sintering and to remain as a crystal phase having a high melting point after the sintering. These two points are essential to obtain a sintered product having high heat resistance, and, in many cases, this is the reason why a rare earth oxide is used as a sintering aid. However, as mentioned above, the phase diagram of a $Si_3N_4$—$SiO_2$-$RE_2O_3$ system is complex, and it has been difficult to produce a sintered product having a grain boundary phase composed solely of the desired high melting point phase.

Under the circumstances, the present inventors have paid an attention to the differences in the phase diagrams and the sinterability among various rare earth elements and have succeeded in letting the J phase ($Lu_4Si_2O_7N_2$) precipitate at the grain boundaries even by an addition of a small amount of Lu oxide, by selecting lutetium (Lu) as the rare earth element and by removing the oxygen impurity in a silicon nitride powder as the starting material, and they have found it possible to obtain a silicon nitride sintered product which has not only high strength but also excellent oxidation resistance. Likewise, they have succeeded in letting $Lu_2SiO_5$ phase precipitate efficiently even by a common sintering method requiring no special heat treatment, by selecting lutetium as the rare earth element and by controlling the composition precisely, and they have found it possible to thereby obtain a sintered product excellent in creep resistance.

Thus, in the first aspect, the present invention provides a silicon nitride sintered product comprising silicon nitride grains and a grain boundary phase, wherein the grain boundary phase consists essentially of a single phase of a $Lu_4Si_2O_7N_2$ crystal phase, and the composition of the silicon nitride sintered product is a composition in or around a triangle ABC having point A: $Si_3N_4$, point B: 28 mol % $SiO_2$-72 mol % $Lu_2O_3$ and point C: 16 mol % $SiO_2$-84 mol % $Lu_2O_3$, as three apexes, in a ternary system phase diagram of a $Si_3N_4$—$SiO_2$—$Lu_2O_3$ system.

In the second aspect, the present invention also provides a silicon nitride sintered product comprising silicon nitride grains and a grain boundary phase of an oxynitride, wherein the composition of the sintered product is a composition in a triangle having point A: $Si_3N_4$, point B: 40 mol % $SiO_2$-60 mol % $Lu_2O_3$ and point C: 60 mol % $SiO_2$-40 mol % $Lu_2O_3$, as three apexes, in a ternary system phase diagram of a $Si_3N_4$—$SiO_2$—$Lu_2O_3$ system.

DETAILED DESCRIPTION OF THE PREFERRED EMBODIMENTS

Firstly, the first aspect of the present invention will be described.

Figure 4:
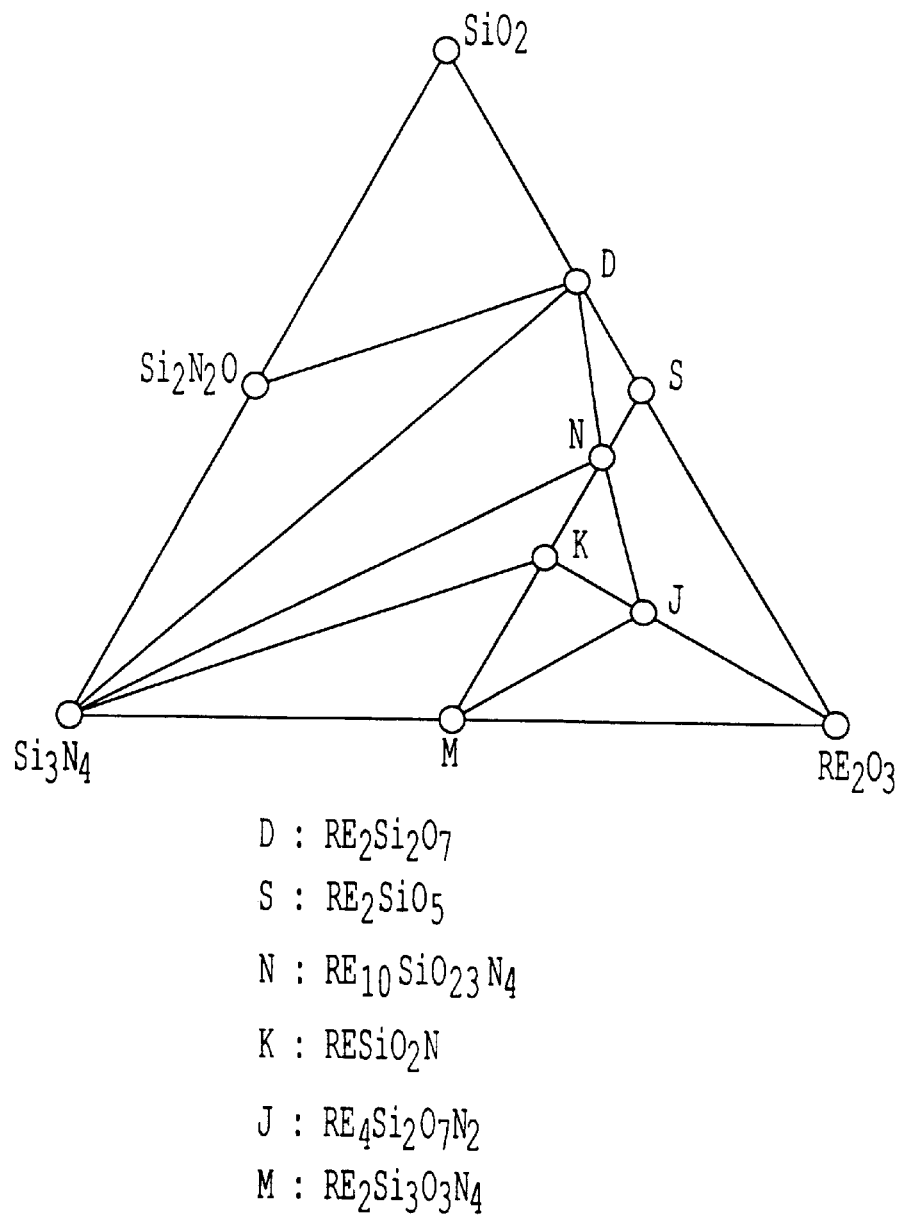
FIG. 4 is a phase diagram of a $Si_3N_4$—$SiO_2$-$RE_2O_3$ ternary system such as $Y_2O_3$.
Figure 5:
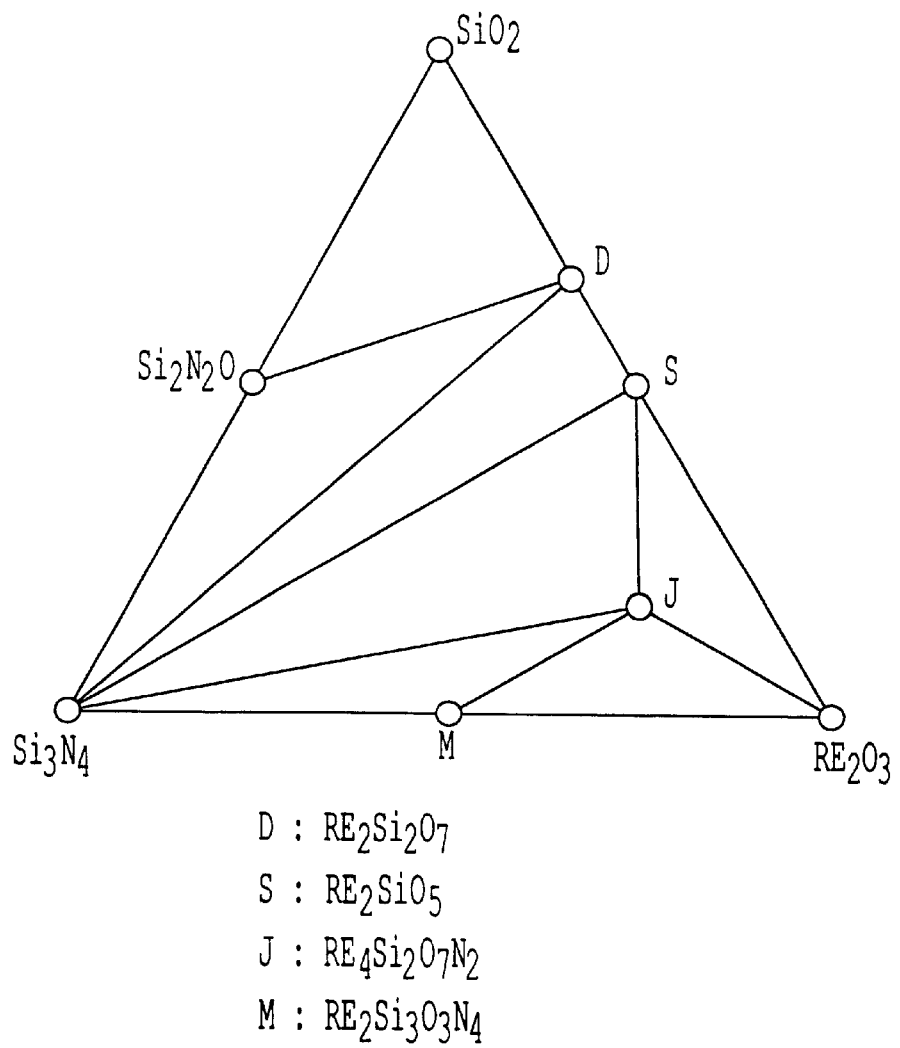
FIG. 5 is a phase diagram of a $Si_3N_4$—$SiO_2$-$RE_2O_3$ ternary system such as $Lu_2O$.

For the $Si_3N_4$—$SiO_2$-$RE_2O_3$ ternary system, there are two types of phase diagrams as shown in FIGS. 4 and 5. The type shown in FIG. 4 is characterized in that the K phase and the N phase are present, and a rare earth element having a large ion radius such as yttrium (Y) belongs to this type. On the other hand, in the phase diagram of the type shown in FIG. 5, these phases are not present, and ytterbium (Yb), thulium (Tm) and lutetium (Lu) belong thereto, as reported in JP-A-8-48565. As a result of a detailed study by the present inventors on the differences among rare elements, Lu was confirmed to belong to the type shown in FIG. 5, and it was found that among rare earth elements, only Lu will be crystallized almost completely at the grain boundaries.

As mentioned above, the chemical composition of the J phase in the $Si_3N_4$—$SiO_2$—$Lu_2O_3$ ternary system is $Lu_4Si_2O_7N_2$ and has a molar ratio of $Si_3N_4$:$SiO_2$:$Lu_2O_3$= 1:1:4. Accordingly, in order to completely crystallize the liquid phase formed during the firing to obtain a silicon nitride sintered product, it is necessary to add $Lu_2O_3$ in an amount corresponding to four times of $SiO_2$ in the composition. If the starting material silicon nitride powder contains 1.5 wt % of oxygen as an impurity (an oxygen content of this level or higher is usually frequently observed), such a content corresponds to about 3 wt % (6 mol %) as calculated as $SiO_2$. Accordingly, in order to make the grain boundary phase a single phase of the J phase, it will be required to add at least 24 mol % of $Lu_2O_3$. However, if such a large amount of the sintering aid is added, oxidation at a high temperature will be facilitated, thus leading to deterioration of the oxidation resistance, as mentioned above. If the grain boundary phase is not a single phase but a mixed phase with other phases, the heat resistance tends to deteriorate. In the silicon nitride sintered products reported heretofore, the grain boundaries are not made of a single phase of $Lu_4Si_2O_7N_2$, but made of a mixture with other phases in all cases.

Under the circumstances, the present inventors reduced the oxygen content of the starting material thereby to reduce the amount of $Lu_2O_3$ to be added as a sintering aid and to let a liquid phase having a composition of $Lu_4Si_2O_7N_2$ form during the firing, and they succeeded in realizing a silicon nitride sintered product having a grain boundary phase made substantially of a single phase of $Lu_4Si_2O_7N_2$. Here, "made substantially of a single phase" means that $Lu_4Si_2O_7N_2$ is crystallized completely or substantially completely to such an extent that no other phase is present or other phase is observed only slightly in the microstructure.

The first aspect of the present invention has been accomplished on the basis of the above discovery.

Namely, as mentioned above, in the first aspect, the present invention provides a silicon nitride sintered product comprising silicon nitride grains and a grain boundary phase, wherein the grain boundary phase consists essentially of a single phase of a $Lu_4Si_2O_7N_2$ crystal phase, and the composition of the silicon nitride sintered product is a composition in or around a triangle ABC having point A: $Si_3N_4$, point B: 28 mol % $SiO_2$-72 mol % $Lu_2O_3$ and point C: 16 mol % $SiO_2$-84 mol % $Lu_2O_3$, as three apexes, in a ternary system phase diagram of a $Si_3N_4$—$SiO_2$—$Lu_2O_3$ system.

As preferred embodiments of the first aspect, the present invention provides the above silicon nitride sintered product, wherein the composition of the silicon nitride sintered product is a composition in or around a quadrangle DEFG having point D: 99 mol % $Si_3N_4$-0.28 mol % $SiO_2$-0.72 mol % $Lu_2O_3$, point E: 99 mol % $Si_3N_4$-0.16 mol % $SiO_2$-0.84 mol % $Lu_2O_3$, point F: 94 mol % $Si_3N_4$-1.68 mol % $SiO_2$-4.32 mol % $Lu_2O_3$ and point G: 94 mol % $Si_3N_4$-0.96 mol % $SiO_2$-5.04 mol % $Lu_2O_3$, on the triangle ABC, as four apexes; the above silicon nitride sintered product, which contains $Lu_4Si_2O_7N_2$ in an amount of from 2.5 to 10 wt %; the above silicon nitride sintered product, wherein the content of elements other than Lu, Si, O and N is not more than 1 wt %; and the above silicon nitride sintered product, wherein at least 90 vol % of the grain boundary phase present in polycrystal grain boundaries (multi-grain junction) is the $Lu_4Si_2O_7N_2$ crystal phase.

Further, the present invention provides a process for producing a silicon nitride sintered product, which comprises adding and mixing from 1 to 12 wt % of a lutetium oxide powder to a silicon nitride powder having an oxygen content of not more than 1.0 wt % and firing the mixture at a temperature of from 1,700 to 2,200° C. in a nitrogen atmosphere under a pressure of from 1 to 100 atm. until the composition as defined above is obtained.

Still further, the present invention provides a process for producing a silicon nitride sintered product, which comprises adding and mixing from 1 to 12 wt % of a lutetium oxide powder to a silicon nitride powder having an oxygen content of not more than 1.5 wt %, heating the mixture at a temperature of not higher than 1,600° C. in a nitrogen atmosphere under a pressure of not higher than 1 atm. to dissipate oxygen until the oxygen content becomes to be the oxygen content of the composition as defined above, prior to firing, and then firing the mixture at a temperature of from 1,700 to 2,200° C. in a nitrogen atmosphere under a pressure of from 1 to 100 atm.

With respect to this process for producing a silicon nitride sintered product, the present invention provides preferred embodiments such that a silicon powder is further added; and the amount of the silicon powder further added is from 1 to 10 wt %.

Furthermore, the present invention provides a process for producing a silicon nitride sintered product, which comprises adding and mixing from 1 to 12 wt % of a lutetium oxide powder to a silicon powder, then, heating the mixture at a temperature of not higher than 1,500° C. in a nitrogen atmosphere to convert silicon to silicon nitride, and then, firing the mixture at a temperature of from 1,700 to 2,200° C. in a nitrogen atmosphere under a pressure of from 1 to 100 atm. until the composition as defined above is obtained.

With respect to this process for producing a silicon nitride sintered product, the present invention provides a preferred embodiment wherein the firing is carried out by hot pressing.

Figure 1:
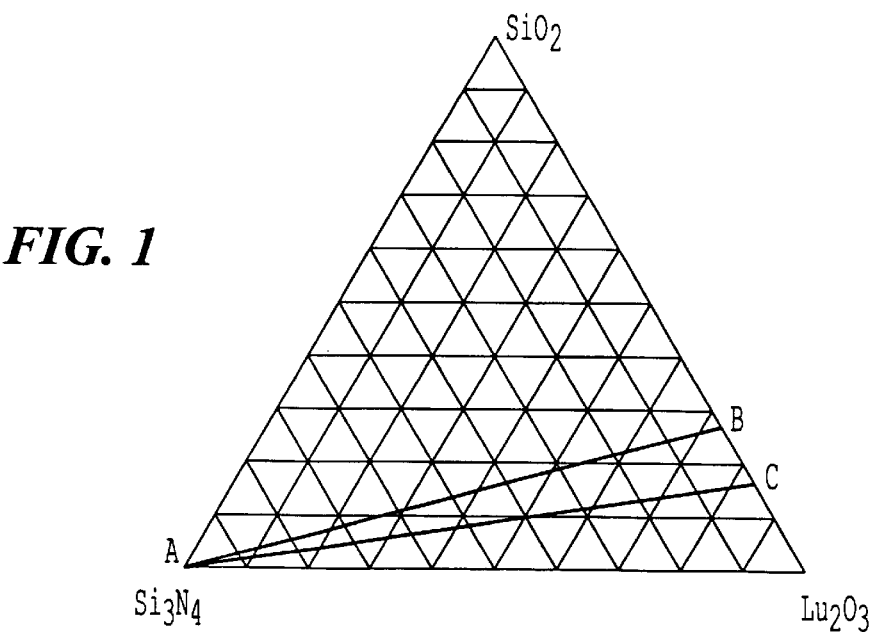
FIG. 1 is a phase diagram of a $Si_3N_4$—$SiO_2$—$Lu_2O_3$ ternary system showing the triangle ABC according to the first aspect of the present invention.

As described above, the silicon nitride sintered product of the first aspect of the present invention is a silicon nitride sintered product comprising silicon nitride grains and a grain boundary phase, wherein the grain boundary phase consists essentially of a single phase of a $Lu_4Si_2O_7N_2$ crystal phase, and the composition of the silicon nitride sintered product is a composition in or around a triangle ABC having point A: $Si_3N_4$, point B: 28 mol % $SiO_2$-72 mol % $Lu_2O_3$ and point C: 16 mol % $SiO_2$-84 mol % $Lu_2O_3$, as three apexes, in a ternary system phase diagram of a $Si_3N_4$—$SiO_2$—$Lu_2O_3$ system as shown in FIG. 1. With a composition on the $SiO_2$ side of the side AB, the S phase ($Lu_2SiO_5$) will precipitate as a crystal phase, and consequently, the high temperature strength will decrease. Further, with a composition on the $Lu_2O_3$ side of the side AC, melilite ($Lu_2Si_3O_3N_4$) will form as a crystal phase, whereby the oxidation resistance will decrease.

The composition of the silicon nitride sintered product can be confirmed by a chemical analysis. Specifically, with respect to Si, Lu and other metal elements, the sintered product is pulverized and then heated and decomposed in a mixed solution of hydrofluoric acid and nitric acid, and their contents in the sintered product are quantitatively analyzed by means of a high frequency induction emission spectrophotometer (ICP). Oxygen and nitrogen can be quantitatively analyzed by means of a technique of gas analysis. Namely, the sintered product is heated and decomposed together with tin and carbon as a combustion improver, and they can be quantitatively analyzed by the concentrations of nitrogen and carbon monoxide in the decomposed gas. When the composition of the silicon nitride sintered product according to the first aspect of the present invention is in or around a quadrangle DEFG having point D: 99 mol % $Si_3N_4$-0.28 mol % $SiO_2$-0.72 mol % $Lu_2O_3$, point E: 99 mol % $Si_3N_4$-0.16 mol % $SiO_2$-0.84 mol % $Lu_2O_3$, point F: 94 mol % $Si_3N_4$-1.68 mol % $SiO_2$-4.32 mol % $Lu_2O_3$ and point G: 94 mol % $Si_3N_4$-0.96 mol % $SiO_2$-5.04 mol % $Lu_2O_3$, on the triangle ABC, as four apexes, the oxidation resistance will be further improved. With a composition on the $Si_3N_4$ side of the side DE, the liquid phase component tends to be small, whereby the densification tends to be slightly poor. With a composition on the $Lu_2O_3$ side of the side FG, the amount of the sintering aid tends to be large, whereby the oxidation resistance tends to be poor.

By firing within the above compositional range, the J phase ($Lu_4Si_2O_7N_2$) will precipitate as a crystal phase at the grain boundaries, yet substantially as a single phase.

The content of $Lu_4Si_2O_7N_2$ in the silicon nitride should properly be from 2.5 to 10 wt %. If the content of $Lu_4Si_2O_7N_2$ is less than 2.5 wt %, the sinterability deteriorates, and the densification tends to hardly proceed. If it exceeds 10 wt %, the oxidation resistance tends to deteriorate. This J phase can be quantified, for example, from the height of the peak by the X-ray diffraction method by preparing a calibration curve with powdery mixtures of $\beta$-$Si_3N_4$ and $Lu_4Si_2O_7N_2$.

Figure 3:
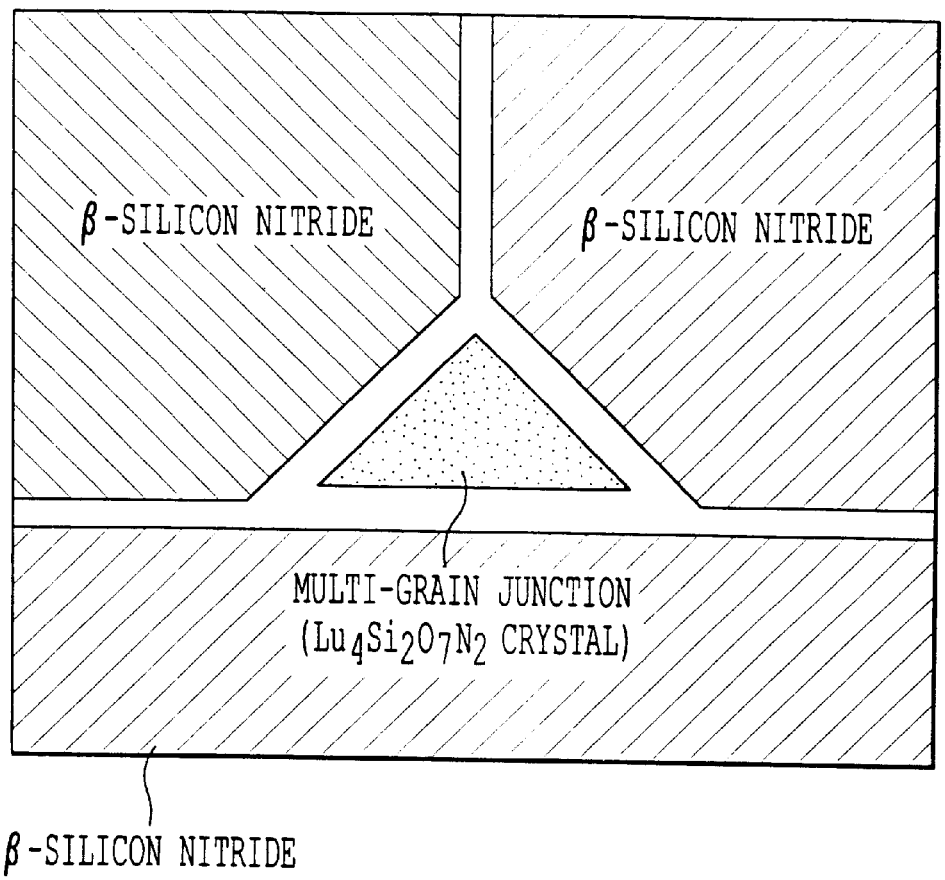
FIG. 3 is a schematic view illustrating a transmission electron microscopic image showing the microstructure of a silicon nitride sintered product.

Further, the silicon nitride sintered product is particularly excellent in heat resistance when the content of elements other than Lu, Si, O and N is not higher than 1 wt %. If the content of elements other than Lu, Si, O and N exceeds 1 wt %, the heat resistance tends to decrease. The heat resistance can be improved by the microstructure of the silicon nitride sintered product. Namely, particularly excellent heat resistance can be realized when a crystal phase of $Lu_4Si_2O_7N_2$ constitutes at least 90 vol % of the grain boundary phase present at the polycrystal grain boundaries as shown in FIG. 3. The rest of the grain boundary phase present at the polycrystal grain boundaries, is usually an amorphous phase having a Si—O—N or Lu—Si—O—N composition. If this amorphous phase exceeds 10 vol %, the heat resistance tends to deteriorate. The quantitative analysis of the $Lu_4Si_2O_7N_2$ crystal phase in the microstructure can be carried out, for example, by cutting out a thin specimen from the sintered product and observing the polycrystal grain boundaries by means of a transmission electron microscope (TEM).

The process for producing the silicon nitride sintered product according to the first aspect of the present invention is characterized mainly by reducing the oxygen content in the starting material, as mentioned above. However, when a silicon nitride is employed as the starting powder, the α-form, the β-form, amorphous or a mixture of two or more of them, may be employed. There is no particular restriction as to the size, distribution, shape or purity of the particles. On the other hand, in order to obtain a sintered product having high strength at both room temperature and a high temperature, a powder having a particle size distribution with a mean particle size of at most 2 μm and a metal impurity content of not higher than 100 ppm, is preferred. The oxygen content in the silicon nitride powder to be used as the starting material, is at most 1.5 wt % (provided that the upper limit is 1.0 wt %, in a case where firing is carried out without carrying out the after-mentioned oxygen dissipation treatment), and the smaller, the better. If the oxygen content exceeds the upper limit, the amount of the sintering aid to be added, increases, whereby the oxidation resistance will be impaired.

As the sintering aid, lutetium oxide $Lu_2O_3$ is added, and the amount to be added is an amount to bring about a composition of $Lu_4Si_2O_7N_2$, which is specifically from 1 to 12 wt %. Within this range, excellent oxidation resistance can be realized. If the amount of $Lu_2O_3$ is less than 1 wt %, the $SiO_2$ component tends to be too much in the liquid phase during the firing, whereby it tends to be difficult to obtain a substantial single phase of the $Lu_4Si_2O_7N_2$ crystal phase. If it exceeds 12 wt %, the grain boundary phase will be a single phase of the $Lu_4Si_2O_7N_2$ crystal phase, but the grain boundary phase tends to be too much, whereby the oxidation resistance tends to deteriorate. If the amount of $Lu_2O_3$ is from 2.25 to 9 wt %, the content of $Lu_4Si_2O_7N_2$ in the silicon nitride sintered product will be from 2.5 to 10 wt %.

In the process for producing the silicon nitride sintered product according to the first aspect of the present invention, the firing is carried out at a temperature of from 1,700 to 2,200° C. in a nitrogen atmosphere under a pressure of from 1 to 100 atm. The firing method is not particularly limited. For example, as the simplest method, it is possible to employ hot pressing. The hot pressing can be carried out, for example, by introducing the starting material powder into a graphite mold, exerting a pressure of from 100 to 500 kg/cm$^2$ in a nitrogen atmosphere of from 1 to 100 atm, and firing at a temperature of from 1,700 to 2,200° C. for from 30 to 120 minutes.

If the atmosphere is less than 1 atm, silicon nitride tends to decompose, whereby the silicon nitride sintered product will not be densified. If it exceeds 100 atm, a high pressure gas will be entrapped and will remain as bubbles in the silicon nitride sintered product, whereby it tends to be difficult to densify the product more than 95%. Further, if the firing temperature is lower than 1,700° C., the liquid phase will not be formed sufficiently, whereby densification will not proceed. If it exceeds 2,200° C., the grain growth tends to be vigorous, whereby the room temperature strength tends to deteriorate.

In the process for producing a silicon nitride sintered product according to the first aspect of the present invention, in order to reduce the amount of the sintering aid as far as possible thereby to secure oxidation resistance, oxygen dissipation treatment to further reduce the oxygen content in the silicon nitride powder may be carried out prior to the firing. Specifically, the oxygen dissipation treatment can be carried out by heating the starting material powder mixture at a temperature of not higher than 1,600° C. in a nitrogen atmosphere under a pressure of not higher than 1 atm. By this oxygen dissipation treatment, the oxygen content is reduced to the level of the oxygen content in the above-mentioned composition of the silicon nitride sintered product. The heating time is usually from 30 to 120 minutes. By the oxygen dissipation treatment, the impurity oxygen contained in the silicon nitride powder will be removed by a reaction such as:

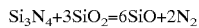

$Si_3N_4+3SiO_2=6SiO+2N_2$

If the heating temperature exceeds 1,600° C., densification will start, whereby it tends to be difficult to efficiently remove oxygen. Further, if the nitrogen atmosphere exceeds 1 atm, the decomposition reaction as mentioned above tends to hardly proceed, whereby the oxygen removal efficiency deteriorates.

The decomposition reaction as mentioned above will proceed efficiently if carried out under reduced pressure.

In order to remove oxygen as an impurity from the starting material silicon nitride powder, in addition to the above-mentioned oxygen dissipation treatment, it is effective to add and mix a silicon powder to the starting material. Added silicon (Si) will react, for example, as follows, thereby to contribute the removal of oxygen:

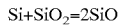

$Si+SiO_2=2SiO$

The addition of the silicon powder varies depending upon the amount of oxygen contained in the silicon nitride powder, but is usually from 1 to 10 wt %. In general, if it is less than 1 wt %, the oxygen removal effect tends to be poor, and if it exceeds 10 wt %, Si may remain in the silicon nitride sintered product and is likely to affect the properties.

It may happen that by the oxygen dissipation treatment, densification tends to hardly proceed. In such a case, densification can be secured, for example, by carrying out the firing by means of hot hydrostatic pressing.

Still further, in the process for producing a silicon nitride sintered product according to the first aspect of the present invention, a silicon powder may be employed as the starting material. As compared with a silicon nitride powder, a silicon powder has a small oxygen content, whereby it will be suitable for forming a liquid phase having a $Lu_4Si_2O_7N_2$ composition while reducing the amount of the sintering aid to be added. However, when the silicon powder is employed as the starting material, it is necessary to carry out nitriding treatment prior to the firing. Specifically, after adding and mixing from 1 to 12 wt % of a lutetium oxide powder to a silicon powder, the mixture is heated at a temperature of not higher than 1,500° C. in a nitrogen atmosphere. This nitriding treatment is a treatment to change silicon to silicon nitride and is essentially different from the above-mentioned oxygen dissipation treatment wherein a silicon powder is added in the case where the silicon nitride powder is used as the starting. material. If the heating temperature exceeds 1,500° C. in the nitriding treatment, melting of silicon will occur, such being undesirable. The nitriding treatment can be carried out, for example, at least 90% of silicon changes to silicon nitride. Whether or not it has changed to silicon nitride, can be ascertained by the X-ray diffraction. After the nitriding treatment, the firing is carried out at a temperature of from 1,700 to 2,200° C. in a nitrogen atmosphere under a pressure of from 1 to 100 atm in the same manner as in the case where the silicon nitride powder is used as the starting material. Also in this case, the firing can be carried out by hot pressing.

The silicon nitride sintered product according to the first aspect of the present invention will be crystallized in its major portion by usual sintering. However, in order to let crystallization proceed further, it is effective to maintain the product at a temperature of from 1,300 to 1,700° C. for from 1 to 24 hours after the sintering.

Now, the second aspect of the present invention will be described.

The $RE_2SiO_5$ phase which is a silicon oxide of a rare earth element, is an oxide having the highest melting point among oxides of $SiO_2$-$RE_2O_3$ type, which is preferred as a composition for the grain boundary phase. However, many of rare earth elements will form the H phase ($RE_5Si_3O_{12}N$) with a composition in the vicinity thereof. The H phase has a low melting point. Accordingly, if a liquid phase composition is designed so that a $RE_2SiO_5$ phase will be the grain boundary phase, there has been a problem that the H phase will partially precipitate, whereby the creep resistance will deteriorate. Further, it has been attempted to crystallize a mixture of $RE_2SiO_5$ and $RE_2Si_2O_7$ at the grain boundaries in order to avoid such a problem. However, as it contains low melting point $RE_2Si_2O_7$, there has been a problem that the heat resistance tends to be low.

As mentioned above, there are two types of phase diagrams for a $Si_3N_4$—$SiO_2$—$Re_2O_3$ system, as shown in FIGS. 4 and 5. Here, RE represents a rare earth element, D $RE_2Si_2O_7$, S $RE_2SiO_5$, K $RESiO_2N$, J $RE_4Si_2O_7N_2$, and M $RE_2Si_3O_3N_4$. The type shown in FIG. 4 is a type wherein the K phase and the H phase are present, and RE having a large ion radius such as yttrium, belongs to this type. On the other hand, in the type shown in FIG. 5, such phases are not present, and JP-B-8-48565 discloses that Yb belongs to this type, Tm and Lu likewise belong to this type.

As mentioned above, as a result of a detailed study on the differences among rare earth elements, Lu was found to belong to the type shown in FIG. 5, and it has been found that among crystals of $RE_2SiO_5$ type of Yb, Tm and Lu, only $Lu_2SiO_5$ will be completely crystallized. Namely, when silicon nitride was to be sintered, $Lu_2O_3$ or a mixture of $Lu_2O_3$ and $SiO_2$, was used as a sintering aid, the molar ratio of $Lu_2O_3$:$SiO_2$ was adjusted to about 1:1 in consideration of the oxygen content in the silicon nitride starting material powder, and the firing was carried out while suppressing the amount of oxygen volatilization, whereby a sintered product comprising silicon nitride and $Lu_2SiO_5$ was obtained.

Figure 6:
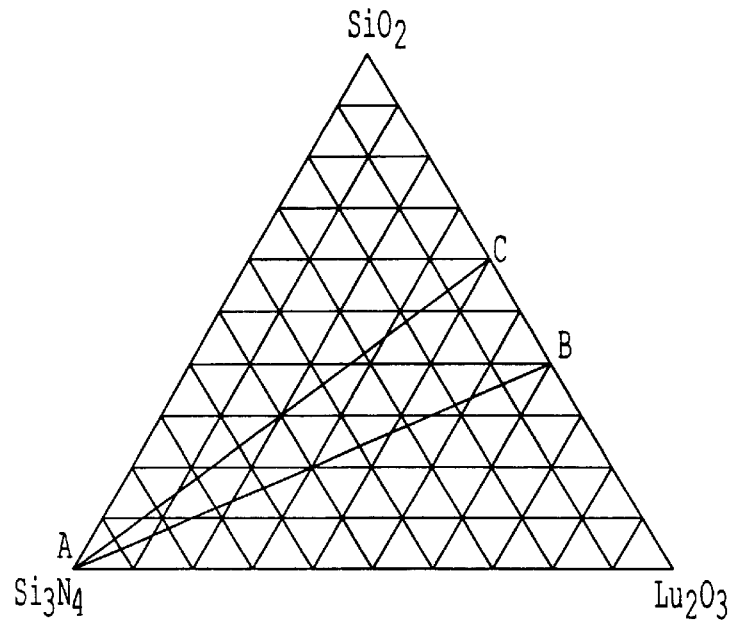
FIG. 6 is a phase diagram of a $Si_3N_4$—$SiO_2$—$Lu_2O_3$ showing the triangle ABC according to the second aspect of the present invention.

The composition of this sintered product is a composition in a triangle having point A: $Si_3N_4$, point B: 40 mol % $SiO_2$-60 mol % $Lu_2O_3$ and point C: 60 mol % $SiO_2$-40 mol % $Lu_2O_3$, as three apexes, in a ternary system phase diagram of a $Si_3N_4$—$SiO_2$—$Lu_2O_3$ system as shown in FIG. 6. It has been confirmed that at least 90 vol % of the grain boundary phase present at the polycrystal grain boundaries, is constituted by the $Lu_2SiO_5$ crystal phase. As the grain boundaries are crystallized almost completely, the sintered product is excellent in creep resistance.

Thus, the sintered product according to the second aspect of the present invention is a silicon nitride sintered product comprising silicon nitride grains and a grain boundary phase of an oxynitride, wherein the composition of the sintered product is a composition in a triangle having point A: $Si_3N_4$, point B: 40 mol % $SiO_2$-60 mol % $Lu_2O_3$ and point C: 60 mol % $SiO_2$-40 mol % $Lu_2O_3$, as three apexes, in a ternary system phase diagram of a $Si_3N_4$—$SiO_2$—$Lu_2O_3$ system as shown in FIG. 6.

On the $SiO_2$ side of the line connecting points A and B, complete crystallization solely of $Lu_2SiO_5$ can not be accomplished, and other crystal phases or a glass phase will remain, whereby the creep resistance tends to be low. On the $Lu_2O_3$ side of the line connecting points A and C, other crystal phases or a glass phase will remain, whereby the creep resistance tends to be low.

Figure 7:
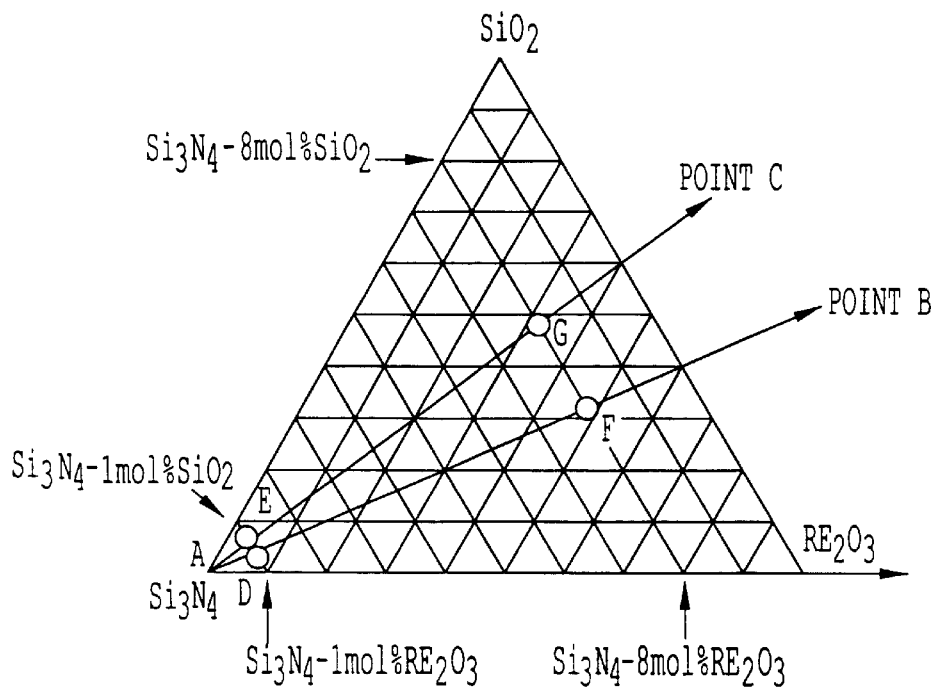
FIG. 7 is a phase diagram of a $Si_3N_4$—$SiO_2$-$RE_2O_3$ system showing the quadrangle DEFG according to the second aspect of the present invention.
Figure 8:
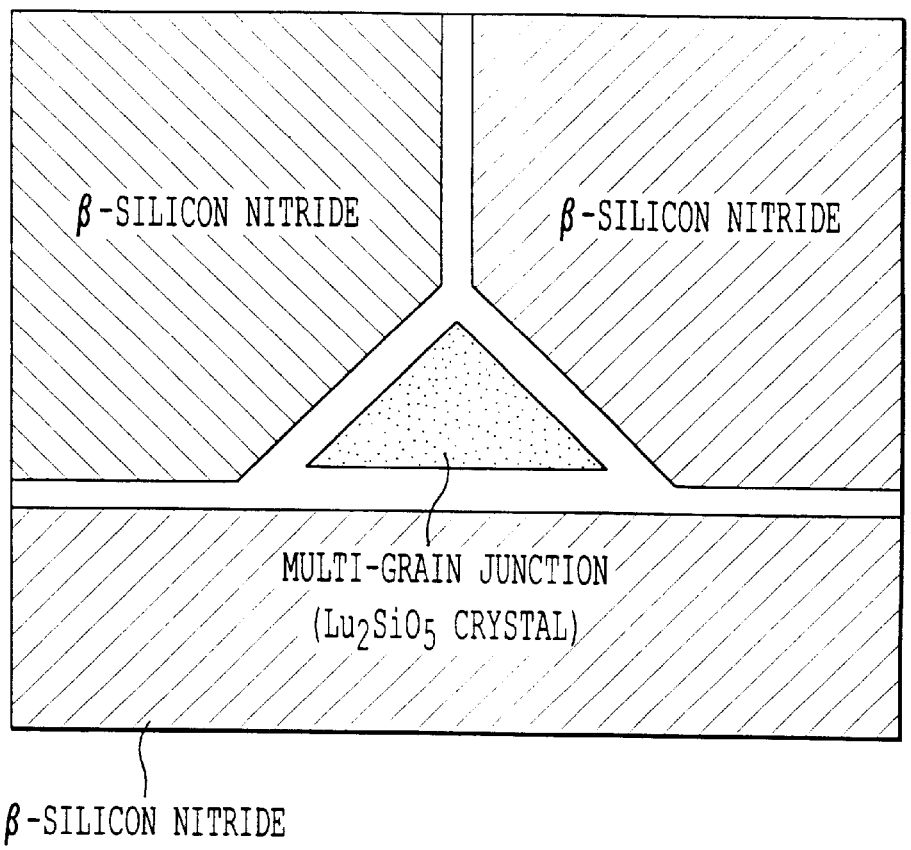
FIG. 8 is a schematic view illustrating the microstructure of the sintered product of Example 10 as observed by a transmission electron microscope.

Further, although the compositional control may tend to be difficult, as a composition whereby higher creep resistance can be obtained, the composition of the sintered product is preferably made to be a composition in a quadrangle having point D: 99 mol % $Si_3N_4$-0.4 mol % $SiO_2$-0.6 mol % $Lu_2O_3$, point E: 99 mol % $Si_3N_4$-0.6 mol % $SiO_2$-0.4 mol % $Lu_2O_3$, point F: 92 mol % $Si_3N_4$-3.2 mol % $SiO_2$-4.8 mol % $Lu_2O_3$ and point G: 92 mol % $SiN_4$-4.8 mol % $SiO_2$-3.2 mol % $Lu_2O_3$, as four apexes in a ternary system phase diagram of a $Si_3N_4$—$SiO_2$—$Lu_2O_3$ system as shown in FIG. 7.

On the $Si_3N_4$ side of the line connecting points D and E, the liquid phase component tends to be small, whereby no adequate densification can be attained. On the $SiO_2$ side of the line connecting points D and F, complete crystallization can not be accomplished, and a glass phase will remain, whereby the creep resistance tends to be low. On the $Lu_2O_3$ side of the line connecting points F and G, the amount of the sintering aid tends to be large, whereby the creep resistance tends to be low. On the $Lu_2O_3$ side of the line connecting points E and G, complete crystallization can not be accomplished, and a glass phase will remain, whereby the creep resistance tends to be low.

In the grain boundary phase, at least 90% is crystallized as $Lu_2SiO_5$, and the creep resistance can be improved by firing until the proportion of an amorphous phase or a crystal phase other than the $Lu_2SiO_5$ crystal phase becomes not higher than 10 vol %. If it exceeds 10 vol %, a liquid phase inferior in the heat resistance will form, whereby the creep resistance tends to be low. The firing conditions to satisfy the above condition may vary depending upon e.g. the composition. However, the crystallization rate is higher as the composition is closer to a composition on the $Si_3N_4$—$Lu_2SiO_5$ line in the phase diagram.

The analysis of the composition of the sintered product is carried out by the following method. The obtained sintered product is pulverized and put into a mixed solution of hydrofluoric acid and nitric acid and subjected to heating and dissolving treatment at 180° C. for 10 hours in a container made of an ethylene trifluoride resin. Then, the Si and Lu concentrations in the solution are quantitatively analyzed by ICP. Then, the sintered product is pulverized and sealed in a tin capsule together with carbon powder and heated and dissolved in a carbon crucible, whereby generated nitrogen and carbon monoxide are quantified to quantitatively analyze the oxygen and nitrogen amounts in the sample. Based on these quantified values, the ratio of Si, Lu, O and N elements is calculated, and thus, the composition on the phase diagram will be obtained.

The polycrystal grain boundaries of the sintered product of the present invention are constituted by crystals of $Lu_2SiO_5$. With respect to silicon nitride containing $RE_2SiO_5$ of a rare earth element, the influences of the differences among rare earth elements over the degree of crystallization and the creep resistance, were investigated in detail, whereby only Lu showed high crystallization at a level of at least 90% and accomplished high creep resistance. Namely, among various compositions of $Si_3N_4$—$SiO_2$-$RE_2O_3$ system, only the composition in the triangle having point A: $Si_3N_4$, point B: 40 mol % $SiO_2$-60 mol % $Lu_2O_3$ and point C: 60 mol % $SiO_2$-40 mol % $Lu_2O_3$, accomplished high crystallization.

Identification of the $Lu_2SiO_5$ crystal phase is carried out by an X-ray diffraction method, and the formation is confirmed from the heights of peaks of $\beta$-$Si_3N_4$, $Lu_2SiO_5$ and other crystal phases. Further, the proportion of the crystal phase in the polycrystal grain boundaries is determined by a transmission electron microscope (TEM). From a sample, a thin specimen is cut out and subjected to ion milling treatment, and then electron diffraction by TEM is carried out, whereby about 50 grain boundaries are observed, and the degree of crystallization is quantified by the area ratio of the crystallized portion and the glass phase portion.

The process for producing the sintered product according to the second aspect of the present invention is not particularly limited, but the following process may be employed. As the starting material powder, an α-type silicon nitride starting material powder is employed. The amount of an oxygen impurity in the starting material is influential over the composition of the grain boundary phase. In the present invention, it is necessary to precisely control the composition of the final sintered product, and with respect to mixing of the starting material, the oxygen impurity in the silicon nitride starting material is quantified, and on the assumption that all of the oxygen impurity is silicon dioxide ($SiO_2$), the composition is determined as a mixture comprising $Si_3N_4$ and $SiO_2$.

As the sintering aid, lutetium oxide $Lu_2O_3$ or a mixture of lutetium oxide $Lu_2O_3$ and silicon dioxide ($SiO_2$) is added so that the composition will be a $Lu_2SiO_5$ composition. Here, in order to determine the composition, it is necessary to determine the starting composition taking into consideration the amount of oxygen ($SiO_2$) contained as an impurity in the silicon nitride starting material and the amount of oxygen to be dissipated during the firing.

The amount of the sintering aid to be added is determined so that the composition of the silicon nitride sintered product will be a composition in a quadrangle having point D: 99 mol % $Si_3N_4$-0.4 mol % $SiO_2$-0.6 mol % $Lu_2O_3$, point E: 99 mol % $Si_3N_4$-0.6 mol % $SiO_2$-0.4 mol % $Lu_2O_3$, point F: 92 mol % $Si_3N_4$-3.2 mol % $SiO_2$-4.8 mol % $Lu_2O_3$ and point G: 92 mol % $SiN_4$-4.8 mol % $SiO_2$-3.2 mol % $Lu_2O_3$, as four apexes in a ternary system phase diagram of a $Si_3N_4$—$SiO_2$—$Lu_2O_3$ system.

The sintering method is not particularly limited, but it is preferred to carry out firing at a temperature of from 1,700 to 2,000° C. in nitrogen under a pressure of from 2 to 100 atm. If the pressure is less than 2 atm, silicon nitride and silicon dioxide are likely to react and decompose during the firing, whereby the compositional variation tends to be large, and a dense sintered product can hardly be obtained. If the pressure exceeds 100 atm, a high pressure gas is likely to be entrapped in the sintered product, whereby voids will be formed in the sintered product, whereby a dense sintered product can hardly be obtained.

Most simply, the firing is carried out by hot pressing under a nitrogen gas pressure. For example, it is a method wherein the starting powder is put into a graphite mold, and a pressure of from 100 to 500 kg/cm² is exerted in nitrogen under a pressure of from 2 to 10 atm, and firing is carried out at a temperature of from 1,700 to 2,000° C. for from 30 to 120 minutes. If the atmosphere is less than 2 atm, volatilization of oxygen in the sintered product tends to be vigorous, whereby the compositional control tends to be difficult. If the atmosphere exceeds 10 atm, a high pressure gas is likely to be entrapped and will remain in the silicon nitride sintered product, whereby densification will not proceed beyond 95%. If the firing temperature is lower than 1,700° C., no adequate liquid phase will form, whereby no adequate densification can be accomplished. If the firing temperature exceeds 2,000° C., the grain growth tends to be vigorous, whereby the room temperature strength tends to be low.

The amount of oxygen volatilization during the firing is preferably such that the amount of reduction calculated as $SiO_2$ will be not more than 40% of the total of $SiO_2$ contained in the silicon nitride starting material and $SiO_2$ added. If the amount of oxygen volatilization exceeds this level, the compositional change during the firing tends to be large, whereby crystallization of $Lu_2SiO_5$ beyond 90% will be difficult.

Now, the present invention will be described in further detail with reference to Examples and Comparative Examples. However, it should be understood that the present invention is by no means restricted by such specific Examples.

Firstly, the silicon nitride sintered product and the process for its production according to the first aspect of the present invention will be described with reference to Examples and Comparative Examples.

TABLE 1

| Example No. | Composition of starting material powder mixture | | | Firing condition | | | Composition of sintered product as quantified | | | | Composition of sintered product on phase diagram | | |
|---|---|---|---|---|---|---|---|---|---|---|---|---|---|
| | $Si_3N_4$ Powder | $Si_3N_4$ wt % | $Lu_2O_3$ wt % | Pattern | Temp. ° C. | Time hr | Lu wt % | Si wt % | O wt % | N wt % | $Si_3N_4$ mol % | $SiO_2$ mol % | $Lu_2O_3$ mol % |
| 1 | P1 | 91.82 | 8.18 | S1 | 1800 | 1 | 7.34 | 55.01 | 1.16 | 36.49 | 96.20 | 0.70 | 3.10 |
| 2 | P3 | 98.72 | 1.28 | S2 | 1900 | 2 | 1.15 | 59.27 | 0.19 | 39.39 | 98.40 | 0.14 | 0.46 |
| 3 | P3 | 92.65 | 7.35 | S2 | 1800 | 2 | 6.58 | 55.52 | 1.09 | 36.82 | 96.40 | 0.84 | 2.76 |
| 4 | P3 | 93.35 | 6.65 | S2 | 1800 | 2 | 5.98 | 55.94 | 0.97 | 37.11 | 96.80 | 0.70 | 2.50 |
| 5 | P1 | 94.84 | 5.16 | S2 | 2000 | 1 | 4.64 | 56.87 | 0.74 | 37.75 | 97.60 | 0.48 | 1.92 |
| 6 | P1 | 93.85 | 6.15 | S2 | 2000 | 1 | 5.52 | 56.22 | 1.01 | 37.24 | 96.00 | 1.12 | 2.28 |
| 7 | P1 | 88.75 | 11.25 | S2 | 2000 | 1 | 10.11 | 53.11 | 1.57 | 35.21 | 94.80 | 0.84 | 4.36 |
| 8 | P1 | 93.73 | 2.44 | S2 | 2000 | 1 | 2.08 | 58.63 | 0.33 | 38.96 | 99.00 | 0.19 | 0.81 |
| 9 | | | 5.58 | S1 | 1800 | 1 | 3.02 | 57.99 | 0.46 | 38.54 | 98.60 | 0.19 | 1.21 |

TABLE 2

| Example No. | Room temp. characteristics of sintered product | | 1500° C. bending strength MPa | 1500° C. oxidation test | |
|---|---|---|---|---|---|
| | Porosity % | Strength MPa | | Weight increase mg/cm² | Strength MPa |
| 1 | 1.2 | 1050 | 820 | 0.05 | 1020 |
| 2 | 1.5 | 1130 | 840 | 0.1 | 940 |
| 3 | 0.8 | 1010 | 780 | 0.08 | 950 |
| 4 | 0.5 | 1350 | 770 | 0.12 | 1010 |
| 5 | 1.3 | 1050 | 760 | 0.09 | 880 |
| 6 | 1.4 | 1030 | 870 | 0.08 | 850 |
| 7 | 0.7 | 1220 | 790 | 0.06 | 1050 |
| 8 | 1.6 | 980 | 820 | 0.02 | 750 |
| 9 | 1.2 | 970 | 870 | 0.01 | 840 |

TABLE 3

| Comparative Example No. | Composition of starting material powder mixture | | | Firing condition | | | Composition of sintered product as quantified | | | | Composition of sintered product on phase diagram | | |
|---|---|---|---|---|---|---|---|---|---|---|---|---|---|
| | Si₃N₄ Powder | Lu₂O₃ wt % | wt % | Pattern | Temp. °C. | Time hr | Lu wt % | Si wt % | O wt % | N wt % | Si₃N₄ mol % | SiO₂ mol % | Lu₂O₃ mol % |
| 1 | P2 | | | S1 | 1800 | 1 | | | | | | | |
| 2 | P2 | 92.56 | 7.44 | S2 | 1700 | 1 | 6.69 | 55.43 | 1.18 | 36.71 | 96.00 | 1.20 | 2.80 |
| 3 | P1 | 99.67 | 0.33 | S1 | 2100 | 2 | 0.3 | 59.8 | 0.24 | 39.65 | 99.00 | 0.88 | 0.12 |

TABLE 4

| Comparative Example No. | Room temp. characteristics of sintered product | | 1500° C. bending strength MPa | 1500° C. oxidation test | | Formed phases by X-ray diffraction | Proportion of J phase by TEM % |
|---|---|---|---|---|---|---|---|
| | Porosity % | Strength MPa | | Weight increase mg/cm² | Strength MPa | | |
| 1 | 1.5 | 1220 | 470 | 0.15 | 950 | J(Yb) | 100 |
| 2 | 12 | 480 | 350 | 8.3 | 310 | J.M | 70 |
| 3 | 25 | 350 | 300 | 50.5 | 220 | J.M | 75 |

EXAMPLE 1

Lutetium oxide was added in an amount of 8.18 wt % to a silicon nitride powder (powder PI) having a mean particle size of 0.5 μm, an oxygen content of 1.0 wt % and an α-type content of 92%, followed by mixing and pulverization for 2 hours by means of a wet system ball mill having ethanol added. Then, the mixture was dried in air by a rotary evaporator and then formed into a molded product of 80 mm×45 mm×10 mm by molding under 20 MPa.

This molded product was put into a graphite mold and fired by means of a gas pressure hot pressing furnace. Firstly, it was heated in a vacuum of $10^{-2}$ Pa from room temperature to 1,300° C. at a rate of 500° C. per hour and then held at 1,300° C. for 1 hour, whereupon nitrogen gas of 10 atm was introduced into the furnace to exert a pressure of 20 MPa, and the temperature was raised to 1,800° C. at a rate of 500° C. per hour and maintained at 1,800° C. for 1 hour. This firing condition is identified as pattern SI in Table 1.

The obtained sintered product was pulverized and put into a mixed solution of hydrofluoric acid and nitric acid, and heating and dissolving treatment was carried out by maintaining the solution at 180° C. for 10 hours in a Teflon container, whereupon the Si and Lu concentrations in the solution were quantified by means of a high frequency induction emission spectrophotometer (ICP). Then, the pulverized product of the sintered product was sealed in a tin capsule together with carbon powder and heat-melted in a carbon crucible, whereby generated nitrogen and carbon monoxide were quantified to quantitatively analyze the oxygen amount and the nitrogen amount in the sintered product.

As shown in Table 1, the quantified values were Lu:7.3375 wt %, Si:55.011 wt %, 0:1.1586 wt %, and N:36.493 wt %. From this result, the composition of the sintered product was 96.20 mol % Si₃N₄-0.703 mol % SiO₂-3.097 mol % Lu₂O₃, and it was a composition in the triangle ABC and in the quadrangle DEFG shown in FIGS. 1 and 2, respectively.

Further, from the results of the x-ray diffraction, the phases formed in the sintered product were found to be β-Si₃N₄ and Lu₄Si₂O₇N₂.

Further, from the sintered product, a thin specimen was cut out and subjected to argon ion milling treatment, whereupon it was observed by means of a transmission electron microscope (TEM). As shown in FIG. 3, a microstructure comprising β-type silicon nitride grains, and two-crystal grain boundaries and polycrystal grain boundaries, were observed. At the polycrystal grain boundaries, crystallization of Lu₄Si₂O₇N₂ was confirmed by the electron diffraction. In all of randomly selected 20 polycrystal grain boundaries, Lu₄Si₂O₇N₂ was crystallized.

Then, the sintered product was subjected to surface grinding by means of a 800 mesh diamond wheel and processed into a size of 3 mm×4 mm×40 mm, whereupon the bending strength was measured by room temperature and high temperature four point bending in accordance with JIS R1601. As shown in Table 2, the porosity of the sintered product was 1.2%, the room temperature four point bending strength was 1,050 MPa, and the high temperature four point bending strength at 1,500° C. was 820 MPa. Further, the test specimen after processing was heated to 1,500° C. in a furnace of atmospheric air and maintained for 100 hours. After this oxidation test, the weight increase was 0.05 mg/cm², and the room temperature four point bending strength was 1,020 MPa. The oxidation resistance is evaluated by the weight change and the room temperature strength when heated in air. If oxidation proceeds, an oxide film will form, whereby a weight increase and a decrease in strength will be observed.

From the foregoing results, the obtained sintered product is judged to be a silicon nitride sintered product which has adequately high strength even at a high temperature and which at the same time has excellent oxidation resistance.

COMPARATIVE EXAMPLE 1

Ytterbium oxide was added in an amount of 12 wt % to a silicon nitride powder (power P2) having a mean particle size of 0.3 μm, an oxygen content of 1.8 wt % and an α-type content of 90%, followed by mixing and pulverizing in the same manner as in Example 1, and the mixture was formed into a molded product.

This molded product was put into a graphite mold and fired by means of a gas pressure hot pressing furnace. Firstly, it was heated in a vacuum of $10^{-2}$ Pa from room temperature to 800° C. at a rate of 500° C. per hour, and then nitrogen gas of 10 atm was introduced into the furnace to exert a pressure of 20 MPa, and the temperature was raised to 1,800° C. at a rate of 500° C. per hour and maintained at 1,800° C. for 1 hour. From the results of the X-ray diffraction, the formed phases were confirmed to be $\beta$-$Si_3N_4$ and $Yb_4Si_2O_7N_2$. Further, from the observation by means of TEM, the grain boundary phase was confirmed to be entirely $Yb_4Si_2O_7N_2$.

With respect to the obtained sintered product, the bending strength was measured in the same manner as in Example 1. As a result, as shown in Table 4, the porosity was 1.5%, the room temperature four point bending strength was 1,220 MPa, and the high temperature four point bending strength at 1,500° C. was 470 MPa. As compared with Example 1, deterioration in the high temperature strength was observed. The deterioration is considered to be attributable to the fact that the grain boundary phase is not $Lu_4Si_2O_7N_2$ but is $Yb_4Si_2O_7N_2$, from the comparison with Example 1.

EXAMPLES 2 TO 7

As shown in Table 1, as the silicon nitride powder, powder P1 which was the same silicon nitride powder as used in Example 1 or a silicon nitride powder (powder P3) having a mean particle size of 0.8 µm, an oxygen content of 0.8 wt % and an α-type content of 95%, was used, and ruthenium oxide was added and mixed thereto in the same manner as in Example 1 in the amount as identified in Table 1, and the mixture was formed into a molded product.

The molded product was put into a graphite mold and fired by means of a gas pressure hot pressing furnace. As the firing condition, pattern S2 different from Example 1 was employed. Namely, the molded product was heated in a vacuum of $10^{-2}$ Pa from room temperature to 1,300° C. at a rate of 500° C. per hour, then nitrogen gas of 0.8 atm was introduced into the furnace at 1,300° C. Then, it was held at 1,500° C. for 1 hour, and then nitrogen gas of 10 atm was introduced into the furnace to exert a pressure of 20 MPa, and the temperature was raised to a level shown in Table 1 at a rate of 500° C. per hour and maintained at that temperature.

The obtained sintered product was subjected to the quantitative analyses of Si and Lu and quantitative analyses of the oxygen amount and the nitrogen amount, in the same manner as in Example 1.

Figure 2:
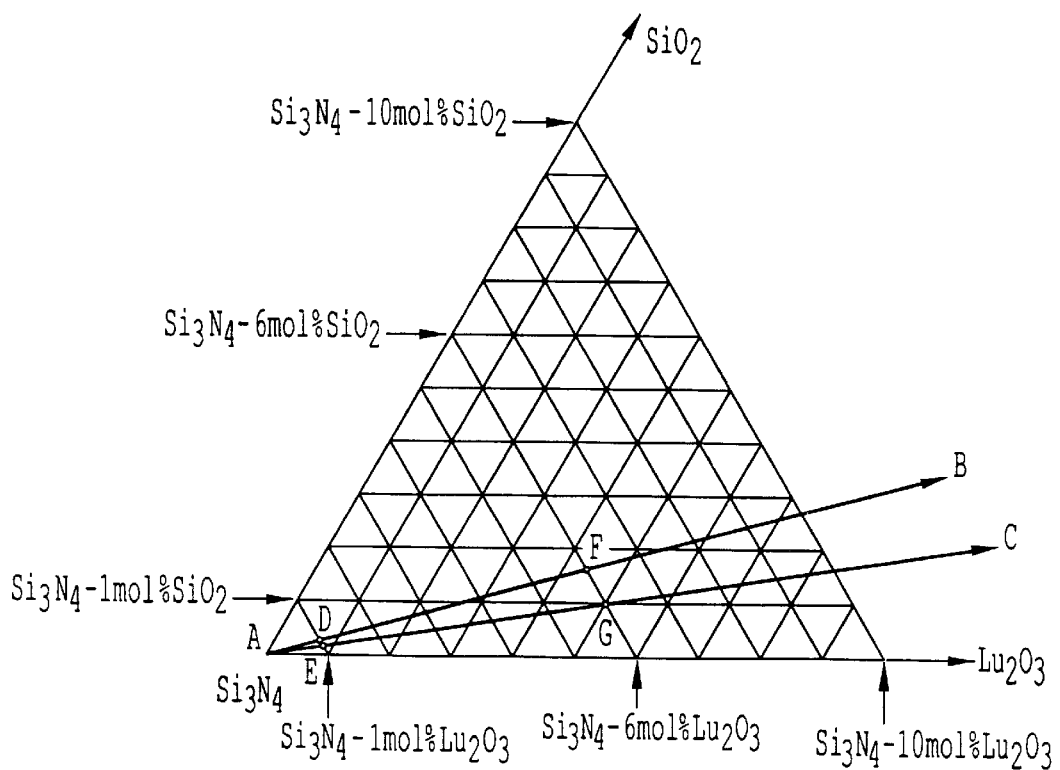
FIG. 2 is a phase diagram of a $Si_3N_4$—$SiO_2$—$Lu_2O_3$ ternary system showing the quadrangle DEFG according to the first aspect of the present invention.

The quantified values and the compositions of the sintered products based thereon are as shown in Table 1, and each composition was a composition in the triangle ABC and the quadrangle DEFG shown in FIGS. 1 and 2, respectively.

Further, from the results of the X-ray diffraction, the formed phases were confirmed to be all $\beta$-$Si_3N_4$ and $Lu_4Si_2O_7N_2$. Further, as a result of the TEM observation, a microstructure comprising β-type silicon nitride grains, and two-crystal grain boundaries and polycrystal grain boundaries, was observed, and from the electron diffraction, crystallization of $Lu_4Si_2O_7N_2$ was confirmed at the polycrystal grain boundaries. At all of randomly selected 20 polycrystal grain boundaries, $Lu_4Si_2O_7N_2$ was crystallized.

And, the bending test and the oxidation test were carried out in the same manner as in Example 1. The porosity, the room temperature four point bending strength and the high temperature four point bending strength at 1,500° C., were as shown in Table 2.

Also in Examples 2 to 7, the obtained sintered products are judged to be silicon nitride sintered products which have adequately high strength even at a high temperature and which at the same time have excellent oxidation resistance.

COMPARATIVE EXAMPLES 2 and 3

As shown in Table 3, as the silicon nitride powder, powder P1 or powder P2 employed in Example 1 or Comparative Example 1, respectively, was employed, and lutetium oxide was added and mixed thereto in the same manner as in Example 1 in an amount as shown in Table 3, and the mixture was formed into a molded product.

This molded product was put into a graphite mold and fired by means of a gas pressure hot pressing furnace. As the firing condition, pattern S1 or pattern S2 employed in Example 1 or Examples 2 to 7, respectively, was employed.

The obtained sintered product was subjected to quantitative analyses of Si and Lu and quantitative analyses of the oxygen amount and the nitrogen amount, in the same manner as in Example 1.

The quantified values and the compositions of the sintered products based thereon were as shown in Table 3. The compositions were dislocated towards the $Lu_2O_3$ side of the composition around the triangle ABC and the quadrangle DEFG shown in FIGS. 1 and 2, respectively. The composition of the grain boundary phase became a $Lu_2O_3$ excessive composition, and from the result of the x-ray diffraction, it was confirmed that the M phase was formed other than $Lu_4Si_2O_7N_2$.

The bending test and the oxidation test were carried out in the same manner as in Example 1. The porosity, the room temperature four point bending strength and the high temperature four point bending strength at 1,500° C., were as shown in Table 4.

With the composition wherein the M phase will form, the viscosity of the liquid phase is high, whereby the sinterability decreases, and no adequate densification can be accomplished. Accordingly, the porosity was high, and consequently, both the room temperature strength and the high temperature strength became low. Further, due to the high porosity, the oxidation resistance also decreased.

EXAMPLE 8

As shown in Table 1, as the silicon nitride powder, powder PI which was the same as the silicon nitride powder as used in Example 1, was employed, and 4.84 wt % of a silicon powder and 2.435 wt % of lutetium oxide were added thereto and mixed in the same manner as in Example 1, and the mixture was formed into a molded product.

This molded product was put into a graphite mold and fired by pattern S2 using a gas pressure hot pressing furnace under the firing conditions as used in Examples 2 to 7.

The obtained sintered product was subjected to quantitative analyses of Si and Lu and quantitative analyses of the oxygen amount and the nitrogen amount, in the same manner as in Example 1. As shown in Table 1, the quantified values were Lu:2.0774 wt %, Si:58.63 wt %, 0:0.3286 wt %, and N:38.964 wt %. From this result, the composition of the sintered product was found to be 99.00 mol % $Si_3N_4$-0.19 mol % $SiO_2$-0.81 mol % $Lu_2O_3$, and is a composition in the triangle ABC and the quadrangle DEFG shown in FIGS. 1 and 2, respectively.

Further, from the results of the X-ray diffraction, the phases formed in the sintered product were confirmed to be $\beta$-$Si_3N_4$ and $Lu_4Si_2O_7N_2$.

Further from the results of the TEM observation, a microstructure comprising β-type silicon nitride grains, and two crystal grain boundaries and polycrystal grain boundaries, was observed, and from the electron diffraction, crystallization of $Lu_4Si_2O_7N_2$ was confirmed at the polycrystal grain boundaries. At all of randomly selected 20 polycrystal grain boundaries, $Lu_4Si_2O_7N_2$ was crystallized.

And, the bending test and the oxidation test were carried out in the same manner as in Example 1. As shown in Table 2, the porosity of the sintered product was 1.6%, the room temperature four point bending strength was 980 MPa, and the high temperature four point bending strength at 1,500° C. was 820 MPa. After the oxidation test, the weight increase was 0.02 mg/cm$^2$, and the room temperature four point bending strength was 750 MPa.

Also in Example 8, the obtained sintered product is judged to be a silicon nitride sintered product which has adequately high strength even at a high temperature and which at the same time has excellent oxidation resistance.

EXAMPLE 9

Lutetium oxide was added in an amount of 5.58 wt % to a silicon powder having an average particle size of 0.8 μm, followed by mixing and pulverizing in the same manner as in Example 1, and then, the mixture was formed into a molded product.

This molded product was heated from room temperature to 1,200° C. in a vacuum of $10^{-2}$ Pa, and then it was heated to 1,400° C. at a rate of 10° C. per hour and maintained at 1,400° C. for 24 hours to carry out nitriding treatment. Thereafter, the molded product was put into a graphite mold and fired in the same manner as in Example 1 under the firing condition of pattern S1.

The obtained sintered product was subjected to quantitative analyses of Si and Lu and quantitative analyses of the oxygen amount and the nitrogen amount, in the same manner as in Example 1. As shown in Table 1, the quantified values were Lu:3.02 wt %, Si:57.99 wt %, 0:0.457 wt %, and N:38.538 wt %. From this result, the composition of the sintered product was found to be 98.60 mol % $Si_3N_4$-0.19 mol % $SiO_2$-1.21 mol % $Lu_2O_3$ and is a composition in the triangle ABC and the quadrangle DEFG shown in FIGS. 1 and 2, respectively.

Further, from the results of the X-ray diffraction, the phases formed in the sintered product were confirmed to be β-$Si_3N_4$ and $Lu_4Si_2O_7N_2$.

Further, as a result of the TEM observation, a microstructure comprising β-type silicon nitride grains, and two crystal grain boundaries and polycrystal grain boundaries, was observed, and from the electron diffraction, crystallization of $Lu_4Si_2O_7N_2$ was confirmed at the polycrystal grain boundaries. At all of randomly selected 20 polycrystal grain boundaries, $Lu_4Si2O_7N_2$ was crystallized.

And, the bending strength and the oxidation test were carried out in the same manner as in Example 1. As shown in Table 2, the porosity of the sintered product was 1.2%, the room temperature four point bending strength was 970 MPa, and the high temperature four point bending strength at 1,500° C. was 870 MPa. After the oxidation test, the weight increase was 0.01 mg/cm$^2$, and the room temperature four point bending strength was 840 MPa.

Also in Example 9, the obtained sintered product is judged to be a silicon nitride sintered product which has adequately high strength even at a high temperature and which at the same time has excellent oxidation resistance.

The first aspect of the present invention is by no means limited by the forgoing practical Embodiments and Examples. Various modifications are possible with respect to details such as the size, the distribution, the shape, the purity, etc. of the starting material powder, the firing conditions, etc.

As described in detail in the foregoing, according to the first aspect of the present invention, a silicon nitride sintered product which has high strength at a high temperature and which at the same time has excellent oxidation resistance, can be provided.

Now, the second aspect of the present invention will be described in detail with reference to Examples and Comparative Examples.

EXAMPLE 10

Lutetium oxide was added in an amount of 6.9 wt % to a silicon nitride powder (powder P4) having a mean particle size of 0.5 μm, an oxygen content of 0.93 wt % and an α-type content of 92%, followed by mixing and pulverizing for 2 hours by means of a wet system ball mill having ethanol added. The starting material powder contained 0.93 wt % of an oxygen impurity, and accordingly, the composition of the starting material powder was calculated as 98.2 wt % $Si_3N_4$-1.8 wt % $SiO_2$, whereby the real composition of the mixture was 91.52 wt % $Si_3N_4$-1.78 wt % $SiO_2$-6.7 wt % $Lu_2O_3$, as shown in Table 5(B). Then, the powder was dried in air by means of a rotary evaporator and formed into a molded product of 80 mm×45 mm×10 mm by molding under a pressure of 200 kg/cm$^2$.

TABLE 5 (A)

| Composition of starting material mixture (wt %) | | | |
|---|---|---|---|
| Example No. | $Si_3N_4$ | $SiO_2$ | $Lu_2O_3$ |
| 10 | 93.2 | 0.1 | 6.7 |
| 11 | 90.2 | 0.5 | 9.3 |
| 12 | 95.5 |  | 4.5 |
| 13 | 91.5 | 0.7 | 7.8 |
| 14 | 90.5 | 0.2 | 9.3 |
| 15 | 88.6 | 0.1 | 11.3 |
| Comparative Example 4 | 96 | 0.6 | 3.4 |
| Comparative Example 5 | 89 | 1.8 | 9.2 |
| Comparative Example 6 | 85.3 |  | 14.7 |
| Comparative Example 7 | 82.5 | 0.3 | 17.2 |

TABLE 5 (B)

| Real composition of starting material (wt %) | | | |
|---|---|---|---|
| Example No. | $Si_3N_4$ | $SiO_2$ | $Lu_2O_3$ |
| 10 | 91.52 | 1.78 | 6.7 |
| 11 | 83.58 | 2.12 | 9.3 |
| 12 | 93.78 | 1.72 | 4.5 |
| 13 | 89.85 | 2.35 | 7.8 |
| 14 | 88.87 | 1.83 | 9.3 |
| 15 | 87.01 | 1.69 | 11.3 |
| Comparative Example 4 | 94.27 | 2.33 | 3.4 |
| Comparative Example 5 | 87.4 | 3.4 | 9.2 |

TABLE 5 (B)-continued

Real composition of starting material (wt %)

| Example No. | $Si_3N_4$ | $SiO_2$ | $Lu_2O_3$ |
|---|---|---|---|
| Comparative Example 6 | 83.76 | 1.54 | 14.7 |
| Comparative Example 7 | 81.01 | 1.79 | 17.2 |

This molded product was put into a graphite mold and fired by means of a gas pressure hot pressing furnace. Firstly, it was heated in a vacuum of $10^{-2}$ Pa from temperature to 1,300° C. at a rate of 500° C. per hour, and nitrogen gas of 10 atm was introduced at this temperature to exert a pressure of 200 kg/cm², and the temperature was raised to 1,800° C. at a rate of 500° C. per hour and maintained at 1,800° C. for 1 hour.

The obtained sintered product was pulverized, then put into a mixed solution of hydrofluoric acid and nitric acid, and subjected to heating and dissolving treatment at 180° C. for 10 hours in a container made of a ethylene tetrafluoride resin, whereupon the Si and Lu concentrations in the solution were quantified by ICP. Then, the sintered product was pulverized, sealed in a tin capsule together with carbon powder and heated and dissolved in a carbon crucible, whereby generated nitrogen and carbon monoxide were quantified to quantitatively analyze the oxygen amount and the nitrogen amount in the sample.

The quantified values were Lu:6.05 wt %, Si:55.79 wt %, 0:1.38 wt % and N: 36.78 wt %. The oxygen amount decreased during the firing, and the reduction calculated as $SiO_2$ was 38%. From these results, the composition of the sintered product was found to be 95 mol % $Si_3N_4$-2.5 mol % $SiO_2$-2.5 mol % $Lu_2O_3$ and was a composition in ABC and DEFG in FIGS. 6 and 7, respectively. Further, as a result of the X-ray diffraction, the formed phases were $\beta$-$Si_3N_4$ and $Lu_4Si_2O_7N_2$.

The obtained sintered product was subjected to surface grinding by a 800 mesh diamond wheel and processed into a shape of 3 mm×4 mm×10 mm, followed by pressing under a compression pressure of 300 MPa to obtain the creep deformation rate. The deformation rate was $1.2\times10^{-8}$ per second, thus showing excellent creep resistance.

From the sintered product, a thin specimen was cut out and subjected to argon ion milling treatment, whereupon it was observed by a transmission electron microscope, whereby as shown in FIG. 3, it had a microstructure comprising silicon nitride grains, and two crystal grain boundaries and polycrystal grain boundaries. Further, with respect to the polycrystal grain boundaries (point A), electron diffraction was carried out to determine the crystal phase of the grain boundary phase.

Further, the polycrystal grain boundaries were investigated by the electron diffraction, whereby crystallization of $Lu_2SiO_5$ was observed. Further, randomly selected 50 polycrystal grain boundaries were investigated, whereby at all of the 50 grain boundaries, $Lu_2SiO_5$ was crystallized. Thus, by the formation of the grain boundary phase having the $Lu_2SiO_5$ composition, a silicon nitride sintered product having creep resistance at a high temperature, was obtained.

EXAMPLES 11 TO 15

Lutetium oxide and silicon dioxide were added to the powder P4 in the amounts as identified in Table 5(A), and a molded product was prepared in the same manner as in Example 10. The real composition of the starting material is shown in Table 5(B). This molded product was put into a graphite mold and fired by means of a gas pressure hot pressing furnace. Firstly, it was heated in a vacuum of $10^{-2}$ Pa from room temperature to 1,300° C. at a rate of 500° C. per hour, and then nitrogen gas under a pressure as identified in Table 6(A) was introduced at this temperature to exert a pressure of 200 kg/cm², and the temperature was raised to a level as identified in Table 6(A) at a rate of 500° C. per hour and maintained for a period of time as identified in Table 6(A).

TABLE 6 (A)

Firing condition

| Example No. | Temp. ° C. | Time hr | Gas pressure atm |
|---|---|---|---|
| 10 | 1800 | 1 | 10 |
| 11 | 1850 | 1 | 10 |
| 12 | 2000 | 1 | 10 |
| 13 | 1800 | 2 | 2 |
| 14 | 1950 | 1 | 5 |
| 15 | 1800 | 2 | 4 |
| Comparative Example 4 | 1800 | 1 | 1 |
| Comparative Example 5 | 1800 | 1 | 10 |
| Comparative Example 6 | 1800 | 1 | 10 |
| Comparative Example 7 | 1800 | 1 | 20 |

TABLE 6 (B)

Change in the amount of $SiO_2$ during the firing

| Example No. | Before firing (wt %) | After firing (wt %) | Dissipated amount (wt %) | Dissipation rate (%) |
|---|---|---|---|---|
| 10 | 1.78 | 1.08 | 0.7 | 39 |
| 11 | 2.12 | 1.48 | 0.64 | 30 |
| 12 | 1.72 | 1.01 | 0.71 | 41 |
| 13 | 2.35 | 1.75 | 0.6 | 26 |
| 14 | 1.83 | 1.06 | 0.77 | 42 |
| 15 | 1.69 | 1.13 | 0.56 | 33 |
| Comparative Example 4 | 2.33 | 1.63 | 0.7 | 30 |
| Comparative Example 5 | 3.4 | 2.8 | 0.6 | 18 |
| Comparative Example 6 | 1.54 | 0.94 | 0.6 | 39 |
| Comparative Example 7 | 1.79 | 1.32 | 0.47 | 26 |

With respect to the obtained sintered product, the oxygen and nitrogen amounts in the sample were quantified in the same manner as in Example 10. The quantified values were as shown in Table 7(A) The oxygen amount decreased during the firing, and the reduction rate calculated as $SiO_2$ was as shown in Table 6(B). From these results, the composition of the sintered product was accurately calculated, and the calculated values are as shown in Table 7(B), and the respective compositions were compositions in ABC and DEFG in the phase diagram in FIG. 9.

TABLE 7 (A)

Composition of sintered product (mol %)

| Example No. | $Si_3N_4$ | $SiO_2$ | $Lu_2O_3$ |
|---|---|---|---|
| 10 | 95 | 2.6 | 2.4 |
| 11 | 93 | 3.6 | 3.4 |
| 12 | 96 | 2.4 | 1.6 |
| 13 | 93 | 4.2 | 2.8 |
| 14 | 94 | 2.6 | 3.4 |
| 15 | 93 | 2.8 | 4.2 |
| Comparative Example 4 | 95 | 3.8 | 1.2 |
| Comparative Example 5 | 90 | 6.7 | 3.3 |
| Comparative Example 6 | 92 | 2.4 | 5.6 |
| Comparative Example 7 | 90 | 3.4 | 6.6 |

TABLE 7 (B)

Real composition of sintered product (wt %)

| Example No. | Si | Lu | O | N |
|---|---|---|---|---|
| 10 | 55.94 | 5.82 | 1.37 | 36.87 |
| 11 | 54.3 | 8.14 | 1.9 | 35.65 |
| 12 | 57.24 | 3.93 | 1.08 | 37.75 |
| 13 | 55.18 | 6.8 | 1.86 | 36.15 |
| 14 | 54.39 | 8.1 | 1.68 | 35.84 |
| 15 | 53.17 | 9.87 | 1.96 | 35 |
| Comparative Example 4 | 57.8 | 2.99 | 1.28 | 37.93 |
| Comparative Example 5 | 54.19 | 8.05 | 2.6 | 35.16 |
| Comparative Example 6 | 51.17 | 12.83 | 2.26 | 33.74 |
| Comparative Example 7 | 49.68 | 14.94 | 2.75 | 32.63 |

Further, as a result of the X-ray diffraction, the formed phases were $\beta$-$Si_3N_4$ and $Lu_2SiO_5$. The obtained sintered product was subjected to surface grinding by a 800 mesh diamond wheel and processed into shape of 3 mm×4 mm×10 mm, followed by pressing under a compression pressure of 300 MPa to obtain the creep deformation rate. The deformation rate was as shown in Table 8, which indicates excellent creep resistance.

From the sintered product, a thin specimen was cut out and subjected to argon ion milling treatment, whereupon it was observed by a transmission electron microscope, whereby it had a microstructure comprising silicon nitride grains, and two crystal grain boundaries and polycrystal grain boundaries. Further, the polycrystal grain boundaries were investigated by the electron diffraction, whereby it was found that $Lu_2SiO_5$ was crystallized. Further, randomly selected 50 polycrystal grain boundaries were investigated, whereby the proportion of the $Lu_2SiO_5$ crystal was as shown in Table 8.

Thus, by forming a grain boundary phase having the $Lu_2SiO_5$ composition, a silicon nitride sintered product hardly susceptible to creep deformation at a high temperature, was obtained. Thus, by forming the grain boundary phase having a $Lu_2SiO_5$ composition, a silicon nitride sintered product excellent in creep resistance without no substantial deterioration of the strength at a high temperature, was obtained.

COMPARATIVE EXAMPLES 4 to 7

Lutetium oxide and silicon dioxide were added to the powder P4 in the amounts as identified in Table 5(A), followed by mixing and pulverization for 2 hours by means of a wet system ball mill having ethanol added. The starting material powder contained 0.93 wt % of an oxygen impurity, and the real composition of the mixture was as shown in Table 5(B). Then, the mixture was dried in air by means of a rotary evaporator, and then a molded product of 80 mm×45 mm×10 mm was obtained by molding under a pressure of 20 MPa.

This molded product was put into a graphite mold and fired by means of a gas pressure hot pressing furnace. Firstly, it was heated in a vacuum of $10^{-2}$ Pa from room temperature to 1,300° C. at a rate of 500° C. per hour, and then nitrogen gas under a pressure as identified in Table 6(A) was introduced at this temperature to exert a pressure of 200 kg/cm$^2$, and the temperature was raised to a level as identified in Table 6(A) at a rate of 500° C. per hour and maintained for a period of time identified in Table 6(A).

With respect to the obtained sintered product, the compositional analysis was carried out in the same manner as in Example 10, whereby the quantified values were as shown in Table 7(A). The oxygen amount decreased during the firing, and the reduction rate calculated as $SiO_2$ was as shown in Table 7(B). From these results, the composition of the sintered product was accurately calculated, and the real composition was as shown in Table 7(B), and it was a composition outside of DEFG in the phase diagram of FIG. 9. Further, as a result of the X-ray diffraction, the formed phases were as shown in Table 8.

TABLE 8

Characteristics of sintered product

| | | | Number and proportion of each phase in 50 grain boundary phases | | | | |
|---|---|---|---|---|---|---|---|
| Example No. | Creep rate Per second | Type of RE | $RE_2SiO_5$ | $RE_2SiO_7$ | $RE_4Si_2O_7N_2$ | Amorphous | Proportion of $RE_2SiO_5$ (%) |
| 10 | 1.2 × 0.00000001 | Lu | 50 | | | | 100 |
| 11 | 2.5 × 0.00000001 | Lu | 48 | | | 2 | 96 |
| 12 | 0.5 × 0.00000001 | Lu | 48 | | | 2 | 96 |
| 13 | 2 × 0.00000001 | Lu | 46 | 4 | | | 92 |
| 14 | 3.5 × 0.00000001 | Lu | 47 | | | 3 | 94 |
| 15 | 4 × 0.00000001 | Lu | 45 | | 5 | | 90 |
| Comparative Example 4 | 15 × 0.00000001 | Lu | 8 | 30 | | 12 | 16 |
| Comparative Example 5 | 4 × 0.00000001 | Lu | 2 | 40 | | 8 | 4 |

TABLE 8-continued

Characteristics of sintered product

| | | | Number and proportion of each phase in 50 grain boundary phases | | | | |
|---|---|---|---|---|---|---|---|
| Example No. | Creep rate Per second | Type of RE | $RE_2SiO_5$ | $RE_2SiO_7$ | $RE_4Si_2O_7N_2$ | Amorphous | Proportion of $RE_2SiO_5$ (%) |
| Comparative Example 6 | 24 × 0.00000001 | Lu | 5 | | 31 | 14 | 10 |
| Comparative Example 7 | 28 × 0.00000001 | Lu | 6 | | 29 | 15 | 12 |
| Comparative Example 8 | 20 × 0.00000001 | Y | 31 | 8 | | 11 | 62 |
| Comparative Example 9 | 43 × 0.00000001 | Nd | 25 | 12 | | 13 | 50 |
| Comparative Example 10 | 52 × 0.00000001 | Ce | 12 | | | 38 | 24 |
| Comparative Example 11 | 18 × 0.00000001 | Yb | 40 | | | 10 | 80 |

The creep deformation rate obtained under a compression pressure of 300 MPa in the same manner as in Example 10, was as shown in Table 8, and the creep resistance was poor. It was observed by a transmission electron microscope in the same manner as in Example 10, whereby the proportion of the $Lu_2SiO_5$ crystals was as shown in Table 8.

Figure 9:
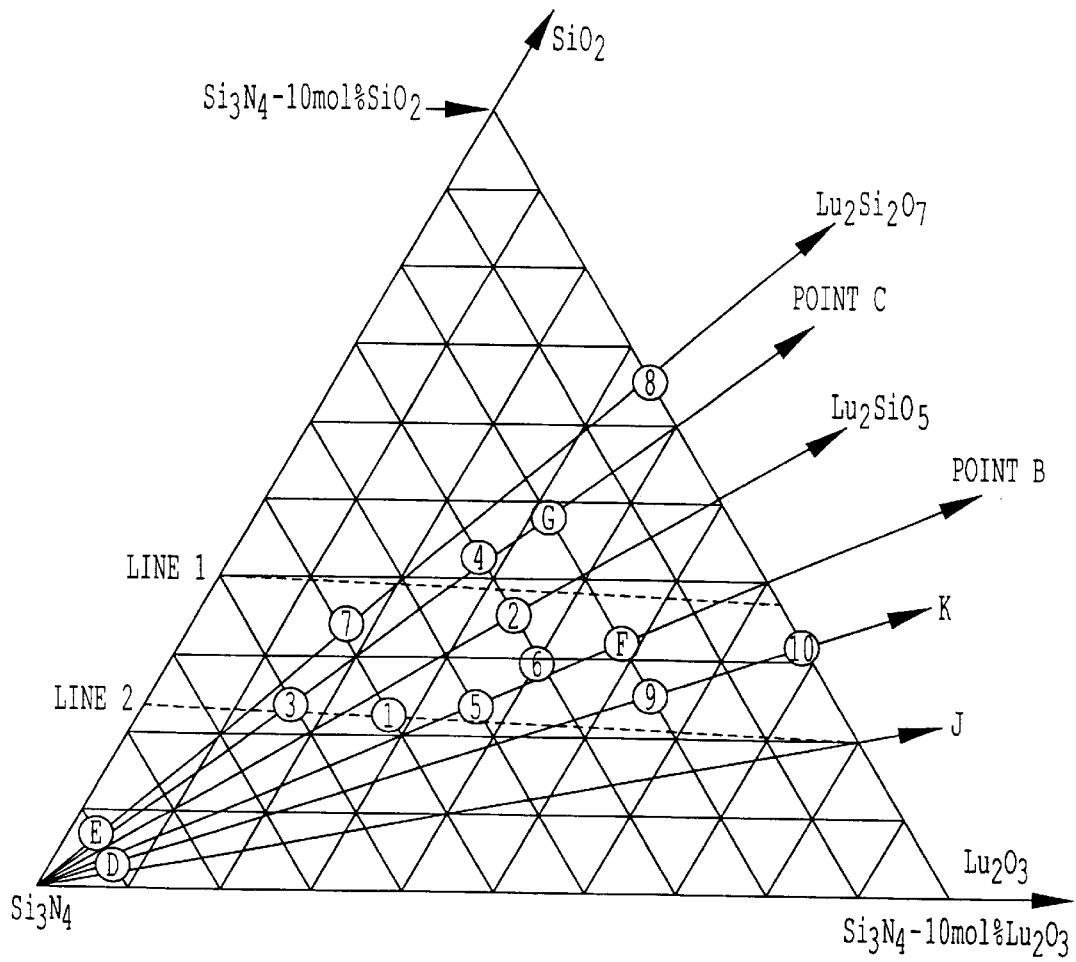
FIG. 9 is a phase diagram of a $Si_3N_4$—$SiO_2$-$RE_2O_3$ system showing the compositions of the sintered products of Examples 10 to 15 and Comparative Examples 4 to 7.

Comparative Example 4 is a composition on the $SiO_2$ side than the line EG in the phase diagram in FIG. 9, and the degree of crystallization of $Lu_2SiO_5$ is low, whereby creep resistance is poor. Comparative Example 5 is a composition on the $SiO_2$ side of the line EG, and the amount of the sintering aid is also large. Accordingly, not only the degree of crystallization of $Lu_2SiO_5$ is low, but also the amount of amorphous substance increases, whereby creep resistance is poor. Comparative Example 6 is a composition on the $Lu_2O_3$ side of the line DF, and the degree of crystallization of $Lu_2SiO_5$ is low, whereby creep resistance is poor. Comparative Example 7 is a composition on the $Lu_2O_3$ side of the line DF, and the amount of the sintering aid is large. Accordingly, not only the degree of crystallization of $Lu_2SiO_5$ is low but also the amount of amorphous substance is large, whereby creep resistance is poor.

Thus, with compositions outside DEFG of the phase diagram in FIG. 9, the degree of crystallization of $Lu_2SiO_5$ was low, and the degree of creep deformation at a high temperature was large.

COMPARATIVE EXAMPLES 8 TO 11

A rare earth oxide (RE: rare earth element) and silicon dioxide were added to the powder P4 to form a composition ($Si_3N_4$-5 mol % $RE$-$2SiO_5$) as identified in Table 9, and a molded product was obtained in the same manner as in Example 10.

TABLE 9

Mixed composition of starting material powders (wt %)

| | $Si_3N_4$ | $SiO_2$ | $Y_2O_3$ | $La_2O_3$ | $CeO_2$ | $Yb_2O_3$ |
|---|---|---|---|---|---|---|
| Comparative Example | | | | | | |
| 8 | 96 | | 4 | | | |
| 9 | 94.4 | | | 5.6 | | |

TABLE 9-continued

Mixed composition of starting material powders (wt %)

| | $Si_3N_4$ | $SiO_2$ | $Y_2O3$ | $La_2O_3$ | $CeO_2$ | $Yb_2O_3$ |
|---|---|---|---|---|---|---|
| 10 | 94.1 | | | | 5.9 | |
| 11 | 93.3 | | | | | 6.7 |

This molded product was put into a graphite mold and fired by means of a gas pressure hot pressing furnace. Firstly, it was heated in a vacuum of $10^{-2}$ Pa from room temperature to 1,300° C. at a rate of 500° C. per hour, and nitrogen gas under a pressure of 10 atm was introduced at this temperature to exert a pressure of 200 kg/cm$^2$, and the temperature was raised to 1,800° C. at a rate of 500° C. per hour and maintained at 1,800° C. for 1 hour.

The formed phases of the obtained sintered product were as shown in Table 8. The creep deformation rate obtained under a compression pressure of 300 MPa in the same manner as in Example 10 was as shown in Table 8, and the creep resistance was poor. The sintered product was observed by a transmission electron microscope in the same manner as in Example 10, whereby the proportion of $RE_2SiO_5$ crystal was as shown in Table 8.

Thus, even with compositions in DEFG of the phase diagram in FIG. 7, if rare earth elements other than Lu were employed, the degree of crystallization of $RE_2SiO_5$ was low, and the degree of creep deformation at a high temperature was large.

A silicon nitride sintered product was a material poor in the heat resistance, since a sintering aid made of an oxide remained at polycrystal grain boundaries after sintering, whereby creep resistance was low. As described in the foregoing, according to the second aspect of the present invention, a sintered product comprising silicon nitride and a grain boundary phase having a $Lu_2SiO_5$ composition is prepared by controlling the firing conditions and the amount and the type of the sintering aid to be added to the silicon nitride starting material powder, whereby it is possible to obtain a material in which the grain boundaries are completely crystallized, and thus it is possible to provide a material excellent in the creep resistance.

What is claimed is:
1. A silicon nitride sintered product comprising silicon nitride grains and a grain boundary phase, wherein the grain boundary phase consists essentially of a single phase of a $Lu_4Si_2O_7N_2$ crystal phase, and the composition of the silicon nitride sintered product is a composition within a triangle ABC having point A: 100 mol % $Si_3N_4$, point B: 28 mol % $SiO_2$-72 mol % $Lu_2O_3$ and point C: 16 mol % $SiO_2$-84 mol % $Lu_2O_3$, as three apexes, in a ternary system phase diagram of a $Si_3N_4$—$SiO_2$—$Lu_2O_3$ system.

2. The silicon nitride sintered product according to claim 1, wherein the composition of the silicon nitride sintered product is a composition within a quadrangle DEFG having point D: 99 mol % $Si_3N_4$-0.28 mol % $SiO_2$-0.72 mol % $Lu_2O_3$, point E: 99 mol % $Si_3N_4$-0.16 mol % $SiO_2$-0.84 mol % $Lu_2O_3$, point F: 94 mol % $Si_3N_4$-1.68 mol % $SiO_2$-4.32 mol % $Lu_2O_3$ and point G: 94 mol % $Si_3N_4$-0.96 mol % $SiO_2$-5.04 mol % $Lu_2O_3$, on the triangle ABC, as four apexes.

3. The silicon nitride sintered product according to claim 1, which contains $Lu_4Si_2O_7N_2$ in an amount of from 2.5 to 10 wt %.

4. The silicon nitride sintered product according to claim 1, wherein the content of elements other than Lu, Si, O and N is not more than 1 wt %.

5. A silicon nitride sintered product comprising silicon nitride grains and a grain boundary phase, wherein the grain boundary phase consists essentially of a single phase of a $Lu_4Si_2O_7N_2$ crystal phase, and the composition of the silicon nitride sintered product is a composition within a triangle ABC having point A: 100 mol % $Si_3N_4$, point B: 28 mol % $SiO_2$-72 mol % $Lu_2O_3$ and point C: 16 mol % $SiO_2$-84 mol % $Lu_2O_3$, as three apexes, in a ternary system phase diagram of a $Si_3N_4$—$SiO_2$—$Lu_2O_3$ system, wherein at least 90 vol % of the grain boundary phase is the $Lu_4Si_2O_7N_2$ crystal phase.

6. A process for producing a silicon nitride sintered product, which comprises adding and mixing from 1 to 12 wt % of a lutetium oxide powder to a silicon nitride powder having an oxygen content of not more than 1.0 wt % and firing the mixture at a temperature of from 1,700 to 2,200° C. in a nitrogen atmosphere under a pressure of from 1 to 100 atm for a time suitable to obtain the silicon nitride sintered product defined in claim 1.

7. A process for producing a silicon nitride sintered product, which comprises adding and mixing from 1 to 12 wt % of a lutetium oxide powder to a silicon nitride powder having an oxygen content of not more than 1.5 wt %, heating the mixture at a temperature of not higher than 1,600° C. in a nitrogen atmosphere under a pressure of not higher than 1 atm to dissipate oxygen for a time suitable to reduce the oxygen content, prior to firing, and then firing the mixture at a temperature of from 1,700 to 2,200° C. in a nitrogen atmosphere under a pressure of from 1 to 100 atm to obtain the silicon nitride sintered product defined in claim 1.

8. The process for producing a silicon nitride sintered product according to claim 7, wherein a silicon powder is further added.

9. The process for producing a silicon nitride sintered product according to claim 8, wherein the silicon powder is added in an amount of from 1 to 10 wt %.

10. A process for producing a silicon nitride sintered product, which comprises adding and mixing from 1 to 12 wt % of a lutetium oxide powder to a silicon powder, then, heating the mixture at a temperature of not higher than 1,500° C. in a nitrogen atmosphere to convert silicon to silicon nitride, and then, firing the mixture at a temperature of from 1,700 to 2,200° C. in a nitrogen atmosphere under a pressure of from 1 to 100 atm for a time suitable to obtain the silicon nitride sintered product defined in claim 1.

11. The process for producing a silicon nitride sintered product according to claim 6, wherein the firing is carried out by hot pressing.

* * * * *